(12) United States Patent
Goodman et al.

(10) Patent No.: US 7,941,488 B2
(45) Date of Patent: May 10, 2011

(54) AUTHORIZING MESSAGE PUBLICATION TO A GROUP OF SUBSCRIBING CLIENTS VIA A PUBLISH/SUBSCRIBE SERVICE

(75) Inventors: Brian D. Goodman, New Haven, CT (US); Frank Jania, Norwalk, CT (US); Konrad C. Lagarde, Milford, CT (US); Chen Shu, Oakville, CT (US); Michael Van Der Meulen, Woodbridge, CT (US)

(73) Assignee: International Business Machines Corporation, Armonk, NY (US)

( * ) Notice: Subject to any disclaimer, the term of this patent is extended or adjusted under 35 U.S.C. 154(b) by 1231 days.

(21) Appl. No.: 10/732,020

(22) Filed: Dec. 10, 2003

(65) Prior Publication Data

US 2004/0122906 A1      Jun. 24, 2004

Related U.S. Application Data

(62) Division of application No. 10/207,711, filed on Jul. 26, 2002.

(51) Int. Cl.
*G06F 15/16*    (2006.01)

(52) U.S. Cl. ........ 709/206; 709/203; 370/352; 370/401; 434/157

(58) Field of Classification Search .................. 709/206, 709/219, 223, 203; 725/116; 370/352, 401; 434/157

See application file for complete search history.

(56) References Cited

U.S. PATENT DOCUMENTS

| | | | |
|---|---|---|---|
| 5,636,344 A | 6/1997 | Lewis | 395/208.11 |
| 5,778,367 A | 7/1998 | Wesinger, Jr. et al. | 707/10 |
| 5,870,552 A | 2/1999 | Dozier et al. | 395/200.49 |
| 5,893,911 A | 4/1999 | Piskiel et al. | |
| 5,915,240 A | 6/1999 | Karpf | 705/2 |
| 6,018,716 A | 1/2000 | Denardo et al. | 705/7 |
| 6,018,730 A | 1/2000 | Nichols et al. | 706/45 |
| 6,028,601 A | 2/2000 | Machiraju et al. | 246/336 |
| 6,128,655 A | 10/2000 | Fields et al. | 709/219 |
| 6,138,120 A | 10/2000 | Gongwer et al. | 707/10 |
| 6,158,007 A | 12/2000 | Moreh et al. | |
| 6,185,603 B1 | 2/2001 | Henderson et al. | |
| 6,209,100 B1 | 3/2001 | Robertson et al. | |
| 6,223,165 B1 | 4/2001 | Lauffer | 705/8 |
| 6,226,359 B1 | 5/2001 | Montgomery et al. | |
| 6,236,991 B1 | 5/2001 | Frauenhofer et al. | 706/6 |
| 6,268,856 B1 | 7/2001 | Bruck et al. | 345/357 |
| 6,286,001 B1 | 9/2001 | Walker et al. | |

(Continued)

FOREIGN PATENT DOCUMENTS

EP     1130845 A2    9/2001

(Continued)

OTHER PUBLICATIONS

Microsoft Corporation (Microsoft), Internet Explorer 4.0 Accessibility, Oct. 1997.

(Continued)

*Primary Examiner* — Tammy T Nguyen

(74) *Attorney, Agent, or Firm* — John E. Campbell; Floyd A. Gonzalez

(57) ABSTRACT

Publishing electronic messages to clients within a group in a Pub/Sub message publishing environment wherein the group includes authorized participating clients in network communication with a pub/sub service. A client is authenticated for authority to publish messages to a selected group of subscribing clients.

24 Claims, 24 Drawing Sheets

U.S. PATENT DOCUMENTS

| | | | |
|---|---|---|---|
| 6,324,587 B1 | 11/2001 | Trenbeath et al. | 709/310 |
| 6,341,960 B1 | 1/2002 | Frasson et al. | 434/322 |
| 6,421,709 B1 | 7/2002 | McCormick et al. | |
| 6,442,529 B1 | 8/2002 | Krishan et al. | 708/14 |
| 6,442,590 B1 | 8/2002 | Inala et al. | |
| 6,477,708 B1 * | 11/2002 | Sawa | 725/116 |
| 6,496,851 B1 | 12/2002 | Morris | 709/204 |
| 6,535,586 B1 | 3/2003 | Cloutier et al. | 379/88.13 |
| 6,539,421 B1 | 3/2003 | Appelman et al. | 709/286 |
| 6,574,658 B1 | 6/2003 | Gabber et al. | |
| 6,587,668 B1 | 7/2003 | Miller et al. | |
| 6,609,103 B1 * | 8/2003 | Kolls | 705/14 |
| 6,651,086 B1 | 11/2003 | Manber et al. | |
| 6,711,154 B1 | 3/2004 | O'Neal | 335/159 |
| 6,732,101 B1 | 5/2004 | Cook | 707/10 |
| 6,807,675 B1 | 10/2004 | Maillard et al. | 725/35 |
| 6,832,245 B1 | 12/2004 | Isaacs et al. | 709/206 |
| 6,941,345 B1 | 9/2005 | Kapil et al. | 709/206 |
| 6,981,223 B2 | 12/2005 | Becker et al. | |
| 6,993,564 B2 | 1/2006 | Whitten, II | |
| 7,017,175 B2 | 3/2006 | Alao et al. | |
| 7,124,167 B1 | 10/2006 | Bellotti et al. | |
| 7,152,094 B1 | 12/2006 | Jannu et al. | |
| 7,155,475 B2 | 12/2006 | Agnoli et al. | |
| 7,194,004 B1 * | 3/2007 | Thomsen | 370/401 |
| 7,209,964 B2 | 4/2007 | Dugan et al. | |
| 7,319,882 B2 | 1/2008 | Mendiola et al. | |
| 7,539,763 B2 | 5/2009 | Toyota et al. | |
| 2001/0049721 A1 * | 12/2001 | Blair et al. | 709/203 |
| 2001/0056422 A1 | 12/2001 | Benedict, Jr. et al. | |
| 2002/0007453 A1 | 1/2002 | Nemovicher | |
| 2002/0023131 A1 | 2/2002 | Wu et al. | 709/205 |
| 2002/0040374 A1 | 4/2002 | Kent | |
| 2002/0062391 A1 | 5/2002 | Densmore | |
| 2002/0072039 A1 * | 6/2002 | Rtischev et al. | 434/157 |
| 2002/0099777 A1 | 7/2002 | Gupta et al. | |
| 2002/0131407 A1 * | 9/2002 | Muhonen | 370/352 |
| 2002/0133534 A1 | 9/2002 | Forslow | |
| 2002/0138588 A1 | 9/2002 | Leeds | |
| 2003/0023692 A1 | 1/2003 | Moroo | |
| 2003/0028525 A1 | 2/2003 | Santos et al. | |
| 2003/0061365 A1 * | 3/2003 | White et al. | 709/229 |
| 2003/0065805 A1 | 4/2003 | Barnes, Jr. | |
| 2003/0108543 A1 | 6/2003 | Lewandowski | |
| 2003/0131073 A1 * | 7/2003 | Lucovsky et al. | 709/219 |
| 2003/0158913 A1 | 8/2003 | Agnoli et al. | |
| 2003/0208543 A1 | 11/2003 | Enete et al. | 709/206 |
| 2003/0212800 A1 * | 11/2003 | Jones et al. | 709/228 |
| 2003/0217105 A1 | 11/2003 | Zircher et al. | |
| 2003/0220972 A1 | 11/2003 | Montet et al. | |
| 2004/0002049 A1 | 1/2004 | Beavers et al. | |
| 2004/0015554 A1 | 1/2004 | Wilson | |
| 2004/0080534 A1 | 4/2004 | Quach | |

FOREIGN PATENT DOCUMENTS

| | | |
|---|---|---|
| EP | 1365553 A1 | 11/2003 |
| WO | WO00/77661 A | 12/2000 |

OTHER PUBLICATIONS

Patel, D, Office Actions dated Dec. 24, 2009 for U.S. Appl. No. 10/207,685, filed Jul. 26, 2002.

Patel, D, Office Action dated Dec. 10, 2009 for U.S. Appl. No. 11/234,987, filed Sep. 26, 2005.

Nguyen, T, Office Actions filed after Mar. 31, 2009 for U.S. Appl. No. 10/207,711, filed Jul. 26, 2002.

Nguyen, T, Office Actions filed after Mar. 31, 2009 for U.S. Appl. No. 11/197,933, filed Aug. 5, 2005.

Nguyen, T, Office Actions filed after Mar. 31, 2009 for U.S. Appl. No. 11/197,964, filed Aug. 5, 2005.

Nguyen, T, Office Actions filed after Mar. 31, 2009 for U.S. Appl. No. 11/197,998, filed Aug. 5, 2005.

Patel, D, Office Actions filed after Mar. 31, 2009 for U.S. Appl. No. 10/207,685, filed Jul. 26, 2002.

Patel, D, Office Actions filed after Mar. 31, 2009 for U.S. Appl. No. 10/730,227, filed Dec. 8, 2003.

Patel, D, Office Actions filed after Mar. 31, 2009 for U.S. Appl. No. 11/226,593, filed Sep. 14, 2005.

Patel, D, Office Actions filed after Mar. 31, 2009 for U.S. Appl. No. 11/234,987, filed Sep. 26, 2005.

Patel, D, Office Actions filed after Mar. 31, 2009 for U.S. Appl. No. 11/245,577, filed Oct. 7, 2005.

Whipple, B, Office Actions filed after Mar. 31, 2009 for U.S. Appl. No. 10/685,860, filed Oct. 15, 2003.

* cited by examiner

US 7,941,488 B2

AUTHORIZING MESSAGE PUBLICATION TO A GROUP OF SUBSCRIBING CLIENTS VIA A PUBLISH/SUBSCRIBE SERVICE

CROSS-REFERENCE TO RELATED APPLICATION

This is a divisional application of Ser. No. 10/207,711 "INTERACTIVE FILTERING ELECTRONIC MESSAGES RECEIVED FROM A PUBLICATION/SUBSCRIPTION SERVICE" filed on Jul. 26, 2002 and assigned to IBM. The disclosure of the forgoing application is incorporated herein by reference.

COPYRIGHT NOTICE

A portion of the disclosure of this patent document contains material which is subject to copyright protection. The copyright owner has no objection to the facsimile reproduction by anyone of the Patent and Trademark Office patent file or records, but otherwise reserves all copyright rights whatsoever.

FIELD OF THE INVENTION

The present invention is related to systems and methods for Publication/Subscription, more particularly to systems and methods for distributed computer users to securely subscribe and publish by way of a Pub/Sub channel.

BACKGROUND OF THE INVENTION

FIG. 1 depicts the elements that make up a typical computer for use in presenting and maintaining an application. The computer 100 consists of a Base Computer 101 which comprises a processor 106, storage media such as a magnetic disk 107 and a high speed volatile main memory 105. An operating system and application programs 111 reside on the storage media 107 and are paged into main memory 105 as needed for computations performed by the processor 106. The Base computer may include optional peripheral devices including a video display 102, a printer or scanner 110, a keyboard 104, a pointing device (mouse) 103 and a connection 108 to a network 109. In a client environment, a user will interact with a (Graphical User Interface) GUI by use of a keyboard 104 and mouse 103 in conjunction with the display of information on the display 102 under control of an application program (application 1) 112. The client application program 112 will then interact with remote users by way of the network 109.

In FIG. 2 an example Internet system is shown. A user at client 1 201 uses applications on his system. This user (user 1 210) at client 1 201 can interact with clients 2-4 202-204 by way of a client server computer 206. Applications 112 may be provided by each client 201-205 and or the client server 206 or some remote server 208 by way of the network 207. The user at client 1 201 can interact with a remote user (user 5 211) at client 5 205 by way of the Internet 207.

Recently, peer to peer (P2P) interconnection has become an interesting alternative. FIG. 3 shows an example P2P network 300 wherein peer 1 301 can communicate with other peers directly. Each peer essentially includes client and server function. Thus, Peer 1 301 acts as a client in sending messages to Peer 2 302. Peer 2 performs some function as a result of receiving the message and may return a message to peer 1. Thus, peer 2 302 acts as a server for peer 1 301. P2P grids provide networked computers that cooperate to perform distributed computing.

Networked clients comprise applications for communication. E-mail applications provide for sending a message to a mail server that then makes the recipient aware of the waiting message. The recipient then can elect to open the message and view it at his client machine. E-mail messages can be sent to a single recipient or can contain a list of several recipients (one to many). One to many e-mail transactions are popular with advertisers and the use of one to many e-mails has been dubbed "SPAM-ing". Recently Instant Messaging (IM) has gained popularity in the form of sending text messages directly to another client. A first user composes an IM and selects a second user as the target. A message is then sent directly to the second user and appears on his display as either a message or the notification of a message. IMs are typical one to one messages.

Refer now to FIG. 4 which depicts a logical view of a pub/sub system of the prior art. A pub/sub service 404 receives messages originating from a content service 401-403 and delivers them to client subscribers 405 406. An example message published includes a topic string, a set of property name-value pairs, and a body. A subscriber identifies a topic string pattern and properties test, and receives matching messages according to a standard, for instance JAVA Message Service (JMS).

The pub/sub system is made up of a Content Provider application (Service) 401-403, the Subscriber (Client) 405-406, and the Pub-Sub Service 404. Applications may implement one or more of these roles. The content provider 401-403 generates content for distribution through the pub/sub system 400. Content providers 401-403 send structured content to one or more instances of the pub/sub service 404. The subscriber 405-406 sends subscription requests 407 to an instance of the pub/sub service 404 and, subject to acceptance of a particular subscription request, receives content 408 from the pub/sub service. The actual content received will be determined by the subscription and the message selection process.

The pub/sub service 404 acts as both a subscription manager 410 and a content distribution agent 411. Applications implementing the pub/sub service role 404 accept subscription requests 407 from subscribers 405 and, subject to any applicable authentication or access control policies, accept or reject subscription requests; and distribute content 408 to valid subscribers 405.

The actual content sent to each subscriber 405-406 by the pub-sub service 404 will be determined by the subscription process 410 and through the message selection process 411.

Applications implementing some aspect of the pub/sub system may act in different roles in different circumstances. For example, an application implementing the pub/sub service role 404 may itself act as a subscriber, subscribing to and receiving content from another instance of the pub-sub service. Similarly, an application acting in the subscriber role may act as a content producer if the end-user of the application wishes to publish a message to the service.

The pub/sub system provides for communication among applications implementing the application roles. There are two primary communications in the pub/sub system: messages are sent from content providers to pub/sub services; and pub/sub services send messages to subscribers 408, 412.

Content providers 401-403 may generate messages from any content source, and subscribers may dispose of messages in any manner they choose. For example, a content provider may simply be a gateway between a raw content source, such as e-mail or web pages, to the pub-sub service. Similarly, a subscriber 405, 406 may act as a gateway between the pub-sub service and an external service such as NNTP or e-mail. An application implementing a particular role defined in the Pub/Sub System may implement different roles at different times.

For example, an application implementing the pub/sub service role 404 may itself act as a subscriber, subscribing to content through another instance of the pub-sub service and receiving messages from that service.

SUMMARY OF THE INVENTION

The present invention (Shotgun) teaches a system for publishing electronic information by way of channels. A user subscribes to a "channel" of information similarly to selecting a Television Channel. Messages of information broadcast from that channel are then directed to the subscriber application which comprises filtering mechanisms to selectively permit messages to be passed on to the shotgun client user. The system maintains a database directory of applications, accessed through an administrative SOAP service. The directory contains security information, channel access controls, owner identification, help text and the like.

Publish/subscribe systems contain information producers and information consumers. Information producers publish events to the system, and information consumers subscribe to particular categories of events within the system. The "system" ensures the timely delivery of published events to all interested subscribers. In addition to supporting many-to-many communication, the primary requirement met by publish/subscribe systems is that producers and consumers of messages are anonymous to each other, so that the number of publishers and subscribers may dynamically change, and individual publishers and subscribers may evolve without disrupting the entire system.

The earliest publish/subscribe systems were subject-based. In these systems, each message belongs to one of a fixed set of subjects (also known as groups, channels, or topics). Publishers are required to label each message with a subject; consumers subscribe to all the messages within a particular subject. For example a subject-based publish/subscribe system for stock trading may define a group for each stock issue; publishers may post information to the appropriate group, and subscribers may subscribe to information regarding any issue.

In one embodiment, a method for receiving electronic messages published through a pub/sub service is described wherein the pub/sub service is in network communication with one or more client systems, the method comprising the steps of: Receiving a message (optionally comprising XML fields, HTML, instant message, email, JPG, JIF, MPEG or SOAP protocol for example) at a client application, published from the pub/sub service the message containing first identifying information; inspecting content of the message according to predefined criteria (comprising keyword search, boolean search etc.) wherein the predefined criteria was created using a GUI interface; and accepting the message by the client application when the first identifying information meets the predefined criteria.

In another version, the accepting step further comprises any one of displaying the message, passing the message to another program module or forwarding the message over a network.

In another embodiment, electronic messages are published within a group in a Pub/Sub message publishing environment the group comprising authorized participating clients in network communication with a pub/sub service, the method comprising the steps of: authenticating a first client identity; receiving a message (optionally comprising XML fields, HTML, instant message, email, JPG, JIF, MPEG or SOAP protocol for example) from the authenticated first client destined for publication to a first group; verifying the first client identity is authorized for the first group; and publishing the message by way of the pub/sub service to clients of the group.

In another version of the embodiment, the message comprises a message envelope, the envelope comprising a message body and a message header.

In another version of the embodiment, the first service publishes to any one of a first application, an automated instant message address (Bot), a servlet or a Mobile Device. The publication may be an application to be run on the authorized subscribers client and the Client Identity is optionally associated with a client group in an authorization database (or table) in one case using LDAP services.

In another embodiment, secure publication and subscription is provided in a system having a pub/sub server having one or more channels, the method comprising the steps of: Providing first subscription access capability to a group channel the first subscription access requiring user authorization; Providing second subscription access capability to a public channel wherein the second subscription access is universally authorized.

In another embodiment, a method is provided for invoking a first client application in a system wherein the system includes a pub/sub server and a second client application, the method comprising the steps of: Subscribing to a channel of a pub/sub server; Receiving a message for invoking the first client application at the second client application from the pub/sub server; and Invoking the first client application using information supplied by the message.

In one option, the embodiment comprises the further step of delaying invoking the first client application until a predefined action is taken at the second client application.

In another option, the embodiment comprises the further steps of: Creating a message for invoking a first client application; Sending the message from a third client application to the pub/sub server channel, the message for publication by way of the pub/sub server channel.

In another embodiment, a method is provided for dynamic management of pub/sub user applications by a user, the method comprising the steps of: Creating a list of pub/sub user applications available to a user; Using the list of user applications to create a GUI interface to a user, the GUI interface comprising at least one of a first user application identifier, an activate first user application function, a deactivate first user application function, a first user application active indicator or a method for displaying information about the first user application.

In one version, the optional step of subscribing to the first user application uses the GUI interface.

Another version comprises the step of performing an authorization action in conjunction with the list in order to permit a user application to appear on the GUI interface to the user.

In still another version, the subscribing step further comprises the step of permitting subscribing to the first user application only when the user is authorized.

In another embodiment, a method is provided for filtering messages from a pub/sub channel, the method comprising the steps of: Receiving a message from the pub/sub channel; Performing an operation on the message wherein the operation is any one of: Saving information to a user file, executing an application identified by the message, presenting information to the user only when predefined criteria permit, permitting user override of function specified by the message, transforming the message to a predetermined media format or forwarding the message to another node.

In one version of the embodiment, the transforming of the message is from any one of text, audio, video or image format to any one of encrypted, decrypted, compressed, decompressed, text, audio, video or image format.

In another version of the embodiment, the other node comprises any one of computer, telephone, radio, television or data file.

In another embodiment, a method is provided for invoking an adjunct application in first client in a system comprising a pub/sub server in network communication with the first client, the method comprising the steps of: Subscribing to a pub/sub server channel using a client application; Receiving a first message from the pub/sub server channel; Obtaining an adjunct application; Incorporating the adjunct application with the client application; Invoking an application published by the pub/sub server channel with the client application.

In one version of the embodiment, obtaining an adjunct application is by way of any one of the first message, a user provided adjunct application or an adjunct application provided by a third party.

In another embodiment, a method for accessing a web service is provided, the method comprising the steps of: retrieving a list of subscribers comprising a community of cooperating users; publishing a message to the community of cooperating users according to the list, the message comprising interfacing information for the web service.

In one optional version of the embodiment, the further step is described for accessing the web service using the interfacing information.

In one embodiment a method for secure publishing of services in a pub/sub system provides web services for security. The web services perform the authentication and authorization and subscribers are authorized via an authorized subscriber table.

Another embodiment provides for publishing automated agents, the method comprising the steps of: Creating an automated agent; Providing an interface to a pub/sub channel for publishing the automated agent; Publishing the automated agent to authorized subscribers to the pub/sub channel.

Another embodiment describes providing a program service comprising one or more modules of program instructions the program service available to subscribing clients comprising the steps of: executing a first module of the program instructions; accessing a remote network service (such as the Internet of the world wide web) by way of a network protocol (such as HTTP); exchanging information with the remote network service thereby performing part of the program service at the remote network service.

It is therefore an object of the present invention to provide a method for publishing electronic messages to clients within a group in a Pub/Sub message publishing environment said group comprising authorized participating clients in network communication with a pub/sub service.

It is another object of the invention to authenticate a client for authority to publish messages to a group of subscribers.

It is yet another object of the invention to publish XML structured messages.

It is another object of the invention to publish messages comprising a message envelope comprising a body and header.

It is another object of the invention to publish SOAP messages.

It is still another object of the invention to publish to applications, automated instant message addresses (Bots), servlets or mobile devices.

It is another object of the invention to publish application to run on authorized subscriber clients.

It is another object of the invention to associate a client identity with a publish/subscribe client group in an authorization database.

The above as well as additional objectives, features, and advantages of the present invention will become apparent in the following written description.

DESCRIPTION OF THE PREFERRED EMBODIMENTS

The present invention provides a method for publishing electronic messages by way of channels in a pub/sub server system wherein subscription to applications and channels is provided by way of a secure GUI application. The example system employing the present invention is herein called "Shotgun".

In a preferred embodiment, Shotgun comprises a Shotgun server application and a Shotgun client application. The Shotgun server application comprises:

1. A Pub/Sub component for broadcasting content provided by a Provider Service application.
2. A publisher security component for supporting and authenticating the Provider Service application for publication of content.
4. A subscriber security component for supporting and authenticating a subscriber.
5. An optional subscriber customization component that, in cooperation with a subscriber, customizes activity associated with the subscriber such as filtering broadcast content based on topic, topic tags or message content and the like.

A Shotgun client application resides on the client machine. The Shotgun client application provides:
1. Communication with the Shotgun Server application.
2. GUI interface for a subscriber to: subscribe to a service; supply credentials to the Shotgun server application; and customize information transmitted and received from the Shotgun Server application and/or agent applications.
3. An optional API interface for attaching agent applications.

Figure 1:
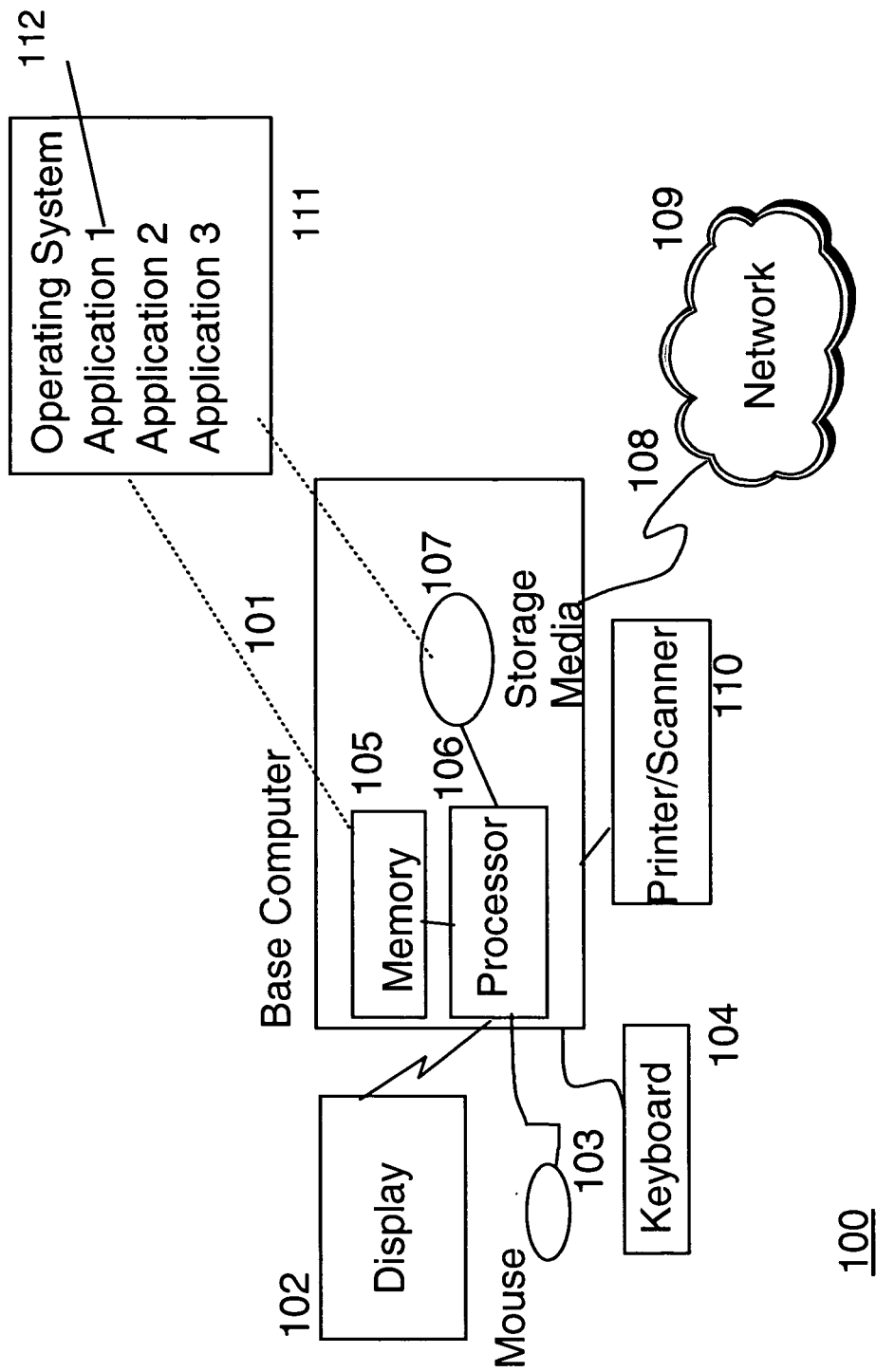
FIG. 1 is a diagram depicting example components of a computer system.
Figure 2:
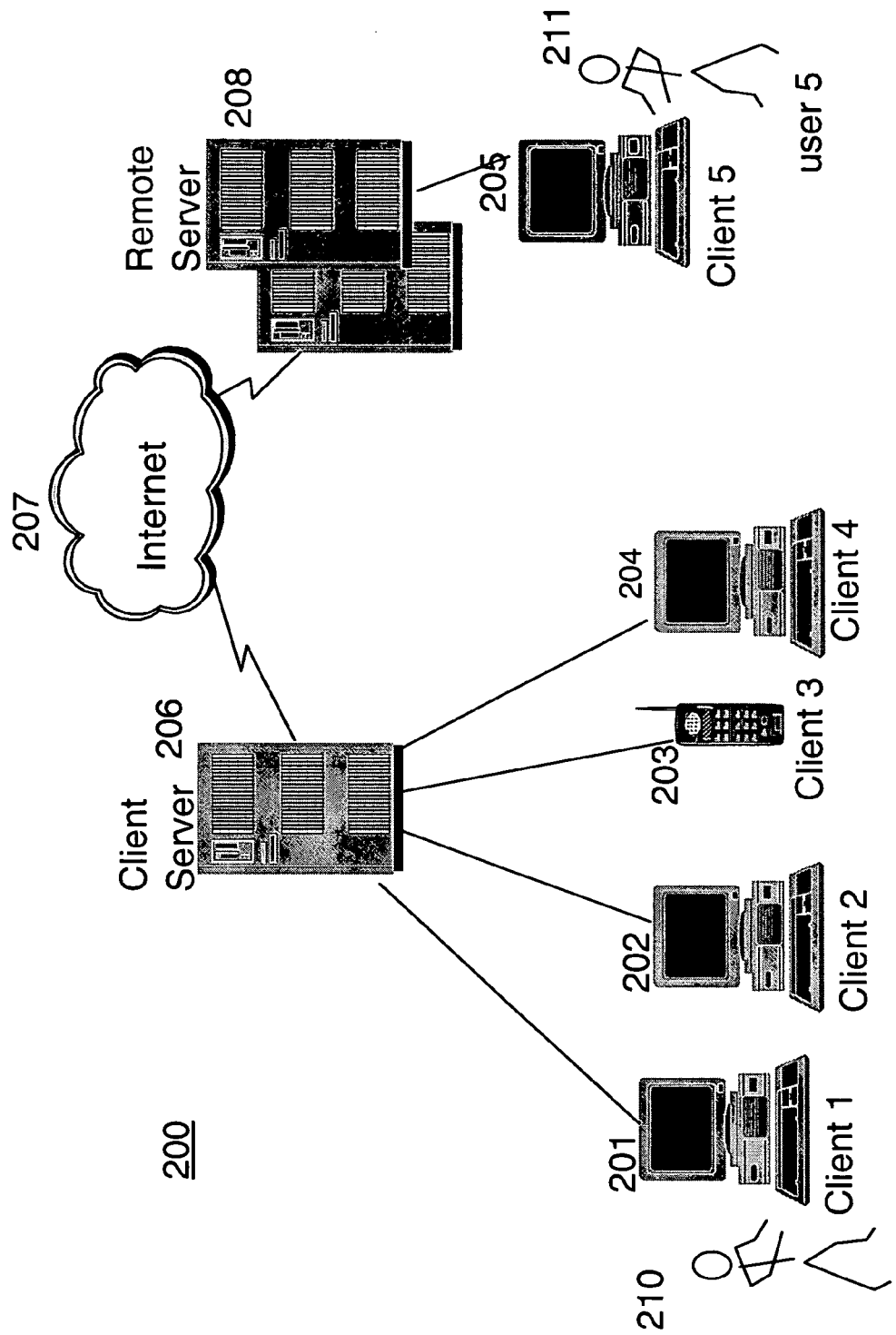
FIG. 2 is a diagram depicting example components of a client-server network.
Figure 3:
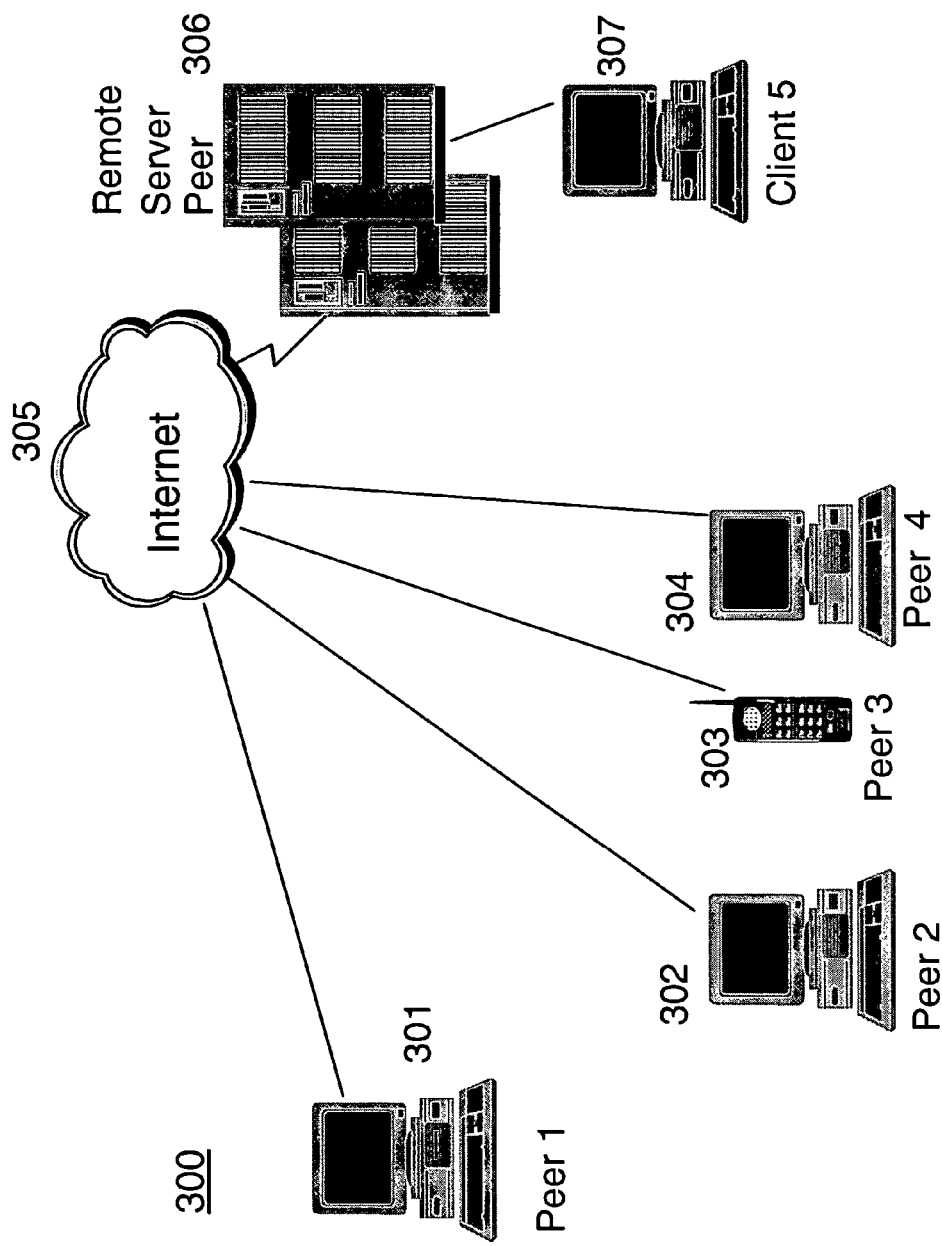
FIG. 3 is a diagram depicting example components of a Peer-to-peer network.
Figure 4:
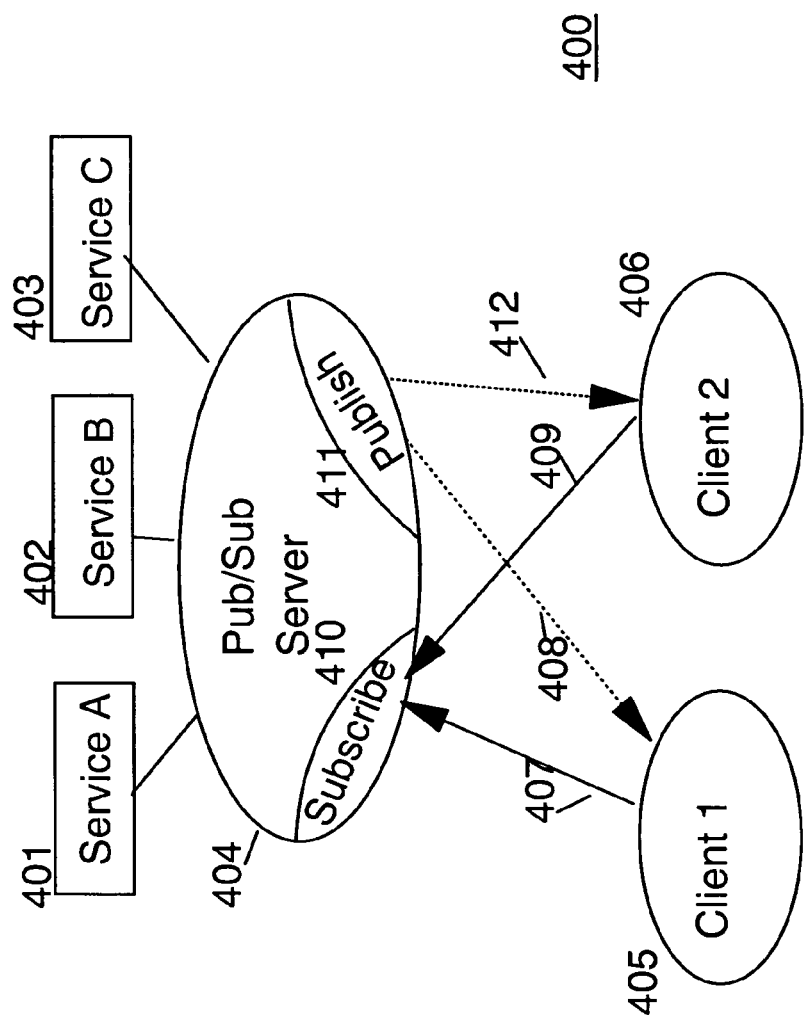
FIG. 4 depicts logical components of a pub/sub system.
Figure 5:
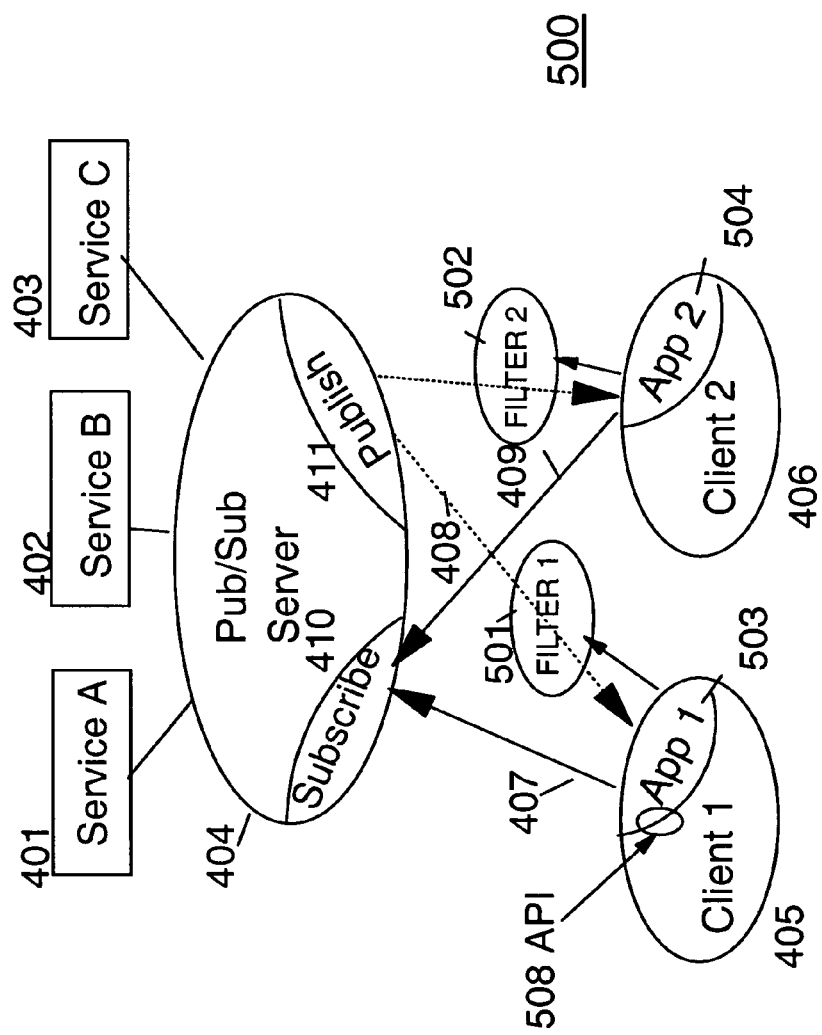
FIG. 5 depicts logical components of a pub/sub system of the present invention.

FIG. 5 shows the system of the prior art of FIG. 4 with a conceptual diagram of one aspect of the present invention added. Shotgun introduces channel and message filtering into a pub/sub environment 404. A Service 401-403 may provide information by way of "channels" to many subscribers by way of the pub/sub service 404. Channels provide a way for services to partition functionality, thus a Stock Brokering service may provide a channel for stock quotes, and another channel for company profile information.

In a preferred embodiment, a channel is a "topic" field appended to a message. The topic may have sub-topic fields associated with it as well. When a subscriber subscribes to a channel of a service, the pub/sub service publishes messages having the selected topic field to the subscriber. Shotgun further provides a filter mechanism to permit the user to define the sub-topics that he is interested in. Shotgun will only publish to the subscriber, messages having topics and sub-topics according to the subscriber's selection.

Shotgun provides a mechanism for allowing a subscriber to subscribe to a service 401-403 and to a channel provided by the service. Shotgun also provides a mechanism to allow a user to create filters on channels and message content (message identifying information) published by the pub/sub service such that only selected channel messages (those messages containing identifying information in accordance with predetermined inspection criteria) are received by the user. Thus, a user can create a channel filter to receive only stock quote messages and a message filter to only receive messages that include IBM stock.

Services A-C 401-403 are available by subscription. Clients 1 and 2 405-406 comprise Applications 1 and 2 respectively 503-504. A user at Client 1 405 subscribes by way of Pub/Sub server 404 to Service B 402. The user performs the Subscription operation using a GUI interface described later herein. Service B 402 sends messages to subscribers by way of Pub/Sub Server 404. Messages are filtered 501-502 by examining the content of the message body for keywords, boolean compares or other methods well known in the art. The filtering criteria is pre-programmed by the user of client 1 405 such that only messages containing information of interest to the user appear at the user's display. Shotgun Application 1 503 controls the filtering criteria but the actual filtering may be done at the pub/sub server in one embodiment or on the client's 405 machine (App 1 503) in another embodiment. Content filtering is performed on the incoming messages based on key words or more complex boolean tests, depending on the implementation. In one embodiment, the user is alerted when a message is available (has passed the filter test) and can elect to receive the full message or discard it.

Subscription to a service 401-403 persists as long as the shotgun client application is active or can be maintained based on other criteria such as elapsed time or specific user actions (on/off selection for example). In a preferred embodiment, the user optionally enables the Shotgun client application to save subscriber information locally and use it to automatically subscribe to predetermined services with predetermined filtering whenever the client is activated (power on).

In a preferred embodiment, shotgun client applications 503-504 include an application program interface (API) 508 providing an interface so that adjunct applications can be provided to the shotgun client applications 503-504. This provides similar functionality to application plug-ins used to extend Web Browser functionality in a Web environment. In a preferred embodiment, an instant messaging (IM) application is provided during a session such that clients can communicate with one another using IM facilities.

In another preferred embodiment, the shotgun client application 503-504 provides a user API 508 enabling a third party application to be plugged into the shotgun client application.

Figure 6:
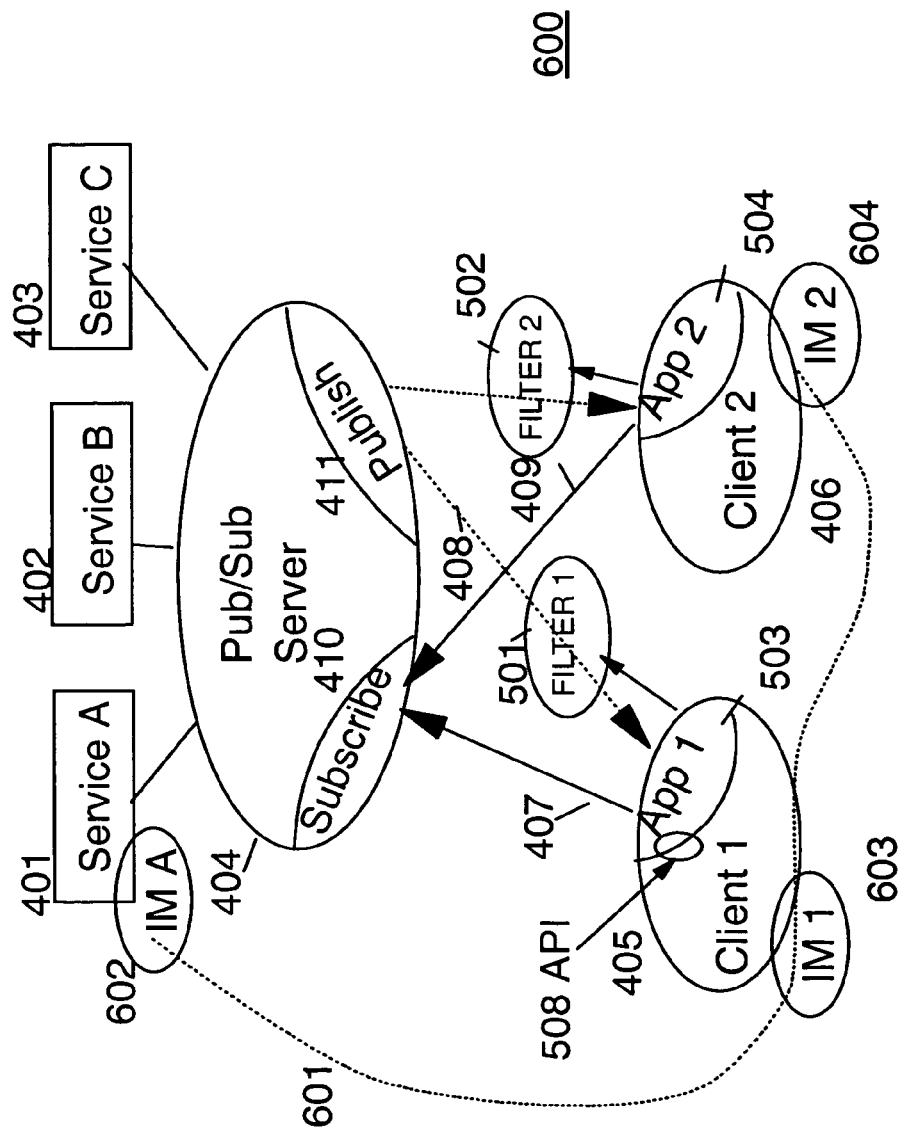
FIG. 6 depicts logical components of a pub/sub system incorporating Instant Messaging of the present invention.

In another preferred embodiment, reference FIG. 6, Client 1 405 subscribes to Service A 401 by way of the pub/sub server 404. Service A provides an active agent IM A 602 which interfaces to the system acting like a user. IM A 602 has an IM address (which it supplies to it's subscribers) and subscribers can communicate with Service A 401 using IM facilities.

Using the embodiment above, a shotgun client can receive information from Service A and communicate with other users or Service A as if Service A were another user (client) by way of IM.

Shotgun automates the security mechanism for controlling who can publish data and on what channels. Shotgun maintains a database directory of applications, accessed through an administrative SOAP service. (SOAP is a lightweight XML based protocol for exchange of information in a decentralized, distributed environment. It includes an envelope that defines a framework for describing what is in a message and how to process it and transport binding framework for exchanging messages using an underlying protocol.) The directory of applications contains channel access controls, owner identification, help text and other application parameters.

The shotgun infrastructure revolves around a publish and subscribe (pub/sub) service. In a preferred embodiment it is an IBM WEBSPHERE service called "MQ Publish & Subscribe". Any pub/sub application could be used to create a Shotgun service as taught by the present application. The WEBSPHERE service adds Enterprise level of security on top of a common broadcast component. The LDAP (Lightweight Directory Access Protocol) directory provides authentication and a grouping technology provides authorization. The application registration provides an additional level of authorization on top of the free form Corporate architecture.

LDAP is a well known directory service protocol that runs over TCP/IP. LDAP provides a method for a client to authenticate or prove its identity to a directory server to help protect the information the server contains.

Secure publisher preferred embodiment (WebService interface):

Security (authentication/Authorization) for the publisher is provided by a private LDAP Directory, an application registration database or any appropriate authorization technique. The publisher preferably uses a Web Service SOAP interface and calls the pub/sub service by providing topic (channel), message, user ID and password over HTTPS secure socket. Alternatively, the publisher calls the pub/sub service by providing topic (channel) and message over HTTPS wherein the user name and password are stored in the HTTP specified REMOTE_USER field.

Gryphon functionality is available in IBM WEBSPHERE available from INTERNATIONAL BUSINESS MACHINES particularly in the component IBM WEBSPHERE MQEVENT BROKER also available from INTERNATIONAL BUSINESS MACHINES, Gryphon provides a new alternative to subject-based systems is content-based messaging systems. Functionality associated with Gryphon can be found in the following U.S. patents: U.S. Pat. No. 6,216,132 "METHOD AND SYSTEM FOR MATCHING CONSUMERS TO EVENTS" (Chandra et al.); U.S. Pat. No. 6,091,724 "ROUTING MESSAGES WITHIN A NETWORK USING THE DATA CONTENT OF THE MESSAGE" (Chandra et al.); U.S. Pat. No. 6,336,119 "METHOD AND SYSTEM FOR APPLYING CLUSTER-BASED GROUP MULTICAST TO CONTENT-BASED PUBLISH-SUBSCRIBE SYSTEM" (Banavar et al.). Each of these patents is assigned to INTERNATIONAL BUSINESS MACHINES and incorporated herein by reference.

A significant restriction with subject-based publish/subscribe is that the selectivity of subscriptions is limited to the predefined subjects. Content-based systems support a number of information spaces, where subscribers may express a "query" against the content of messages published.

The Gryphon system provides content-based publish/subscribe functionality. Clients access the system through an implementation of the Java Message Service (JMS) API. The Gryphon message broker is scalable, available, and secure:

Scalability: Brokers may be added into the network to provide support for additional clients. The configuration support is flexible enough to efficiently support geographic distribution of brokers. Server farms in multiple geographies may be linked through a number of explicit links rather than requiring N×N connectivity between all brokers.

Availability: Gryphon responds to the failure of one broker in a network by rerouting traffic around the failed broker. Reconfiguration is automatic and requires no intervention by an administrator.

Security: Gryphon supports access controls for limiting who may publish and subscribe to portions of the information space. Further, Gryphon currently supports four authentication mechanisms for verifying client identity: simple password (e.g. telnet), mutual secure password authentication (password is never sent over the wire), asymmetric SSL (password sent over a secure SSL connection to the server) and symmetric SSL (both client and server use certificates to authenticate each other). Secrecy and integrity of sensitive messages are protected through state-of-the-art encryption mechanisms.

Gryphon is a distributed computing paradigm for message brokering, which is the transferring of information in the form of streams of events from information providers to information consumers.

In Gryphon, the flow of streams of events is described via an information flow graph. The information flow graph specifies the selective delivery of events, the transformation of events, and the generation of derived events as a function of states computed from event histories.

Message brokering is motivated by the need for efficient delivery of information across a large number of users and applications, in an environment characterized by heterogeneity of computing platforms, anonymity between information producers and consumers, and dynamic change due to system evolution. Within a single business, such as a stock exchange or a weather forecasting agency, there is a dynamically varying number of sub-applications supplying events, and a varying number consuming events. The suppliers and consumers may not necessarily be aware of one another; instead the suppliers may simply be supplying information of a certain type to any interested consumer and each consumer may be interested in subsets of this information having particular properties. For example, in a stock exchange, one consumer may be interested in all stock trades greater than 1000 shares, and another in specific market trends, such as all stock trades representing a drop of more than 10 points from the previous day's high.

There is also a growing need to "glue" together applications within multiple businesses, to support inter-business network commerce or maybe as a result of mergers and acquisitions. For example, a retailer may need to connect to its suppliers and customers, or a customer to various retailers and financial organizations. This may require transforming events from different sources into a compatible form, merging them, and selecting from these events.

Message brokering is an extension of publish-subscribe technology. The Gryphon approach augments the publish-subscribe paradigm with the following features:

1. Content-based subscription, in which events are selected by predicates on their content rather than by pre-assigned subject categories;
2. Event transformations, which convert events by projecting and applying functions to data in events;
3. Event stream interpretation, which allows sequences of events to be collapsed to a state and/or expanded back to a new sequence of events; and
4. Reflection, which allows system management through meta-events.

Gryphon technology includes a collection of efficient implementations to support this paradigm and still provide scalability, high throughput and low latency.

The Gryphon Model

As mentioned earlier, event processing in Gryphon is described via an information flow graph. An information flow graph is a directed acyclic graph constituting an abstraction of the flow of events in the system. In one example, stock trades from two information sources, NYSE and NASDAQ, are combined, transformed, filtered and delivered to a client. The two sources produce events of type (price, volume), which are merged into a single stream. A path computes a new stream of events of type, and another path filters out events with capital less than $1,000,000.

A Gryphon information flow graph is an abstraction because Gryphon is free to physically implement the flow any way it chooses, possibly radically altering the flow pattern, provided that the consumers see the appropriate streams of events consistent with the incoming events and the transformations specified by the graph. Gryphon optimizes graphs and deploys them over a network of brokers (or servers). The broker network is responsible for handling client connections and for distributing events.

The nodes of the graph are called information spaces. spaces are either 1. event histories—monotonically growing collections of events, e.g., stock trade events of the form (price, volume), or 2. event interpretations—states representing interpretations of sequences of events, such as a table (latestprice, highestprice). Each information space has a schema defining the structure of the history or state it contains. Each arc (path) in the information flow graph defines an operation to derive the information space at the head from that at the tail. Arcs can be one of the following types:

"select (P)" specifies that the destination event history contains the subset of events in the source event history that satisfy the predicate P. The two event histories have the same schema.

"transform (T)" specifies that each event in the destination event history is obtained by applying function T to the corresponding event in the source event history.

"merge" combines two or more event histories of the same schema into a single history. This operation is implicit when multiple arcs lead to the same information space.

"interpret (I)" converts a source event history to a destination state by applying an interpretation function I to the history. Each time a new event arrives, this interpretation will be (incrementally) re-evaluated.

"expand (I)" The inversion of interpret: converts a state to an event history which is equivalent to that state under function I. This is a non-deterministic function: in particular, interpreting an event history and re-expanding it with the same I may yield the identical event history, but may also yield a different history which yields an equivalent state under I.

The Gryphon system consists of several components for efficiently realizing the information flow graph over a large distributed network of brokers. Areas of interest include:

Event matching—determining, for each event, the subset of N subscriptions that match the event.

Multicasting—routing the events from source to all destinations while avoiding unnecessary processing of messages at brokers and long message headers on events. Multicast techniques in the prior art use the concept of groups, and do not apply to content-based pub/sub systems.

Graph transformations—reordering the selects, transforms, and interpretations to minimize the number of events sent through the network and the load on the brokers.

Fault-tolerance—preserving the appearance of a persistent information flow graph in the presence of failures. In addition, guaranteeing that, when required, clients have consistent views of information spaces even in the presence of failure so that some clients don't see that an information space contains a message while others see that the same information space has lost the message.

Ordered delivery—guaranteeing that, when required, clients have consistent view of the order of events in an information space.

Optimistic delivery—when a client's view of an information space is through an interpretation, exploits the non-determinism of the equivalent state to deliver messages to the client early, out-of-order, or to drop messages.

Compression—when a client's view of an information space is through an interpretation and the client disconnects and reconnects, exploits the non-determinism of the equivalent state to deliver a compressed sequence of events that captures the same state.

Reconfiguration—allows the physical broker network to be dynamically updated and extended without disturbing the logical view of a persistent information flow graph.

Reflection—capturing events corresponding to requests to change the information flow graph, and confirmed changes to the information flow graph in a special meta-event space.

Security—dealing with issues concerning the lack of full mutual trust between domains in the physical broker network.

Figure 7:
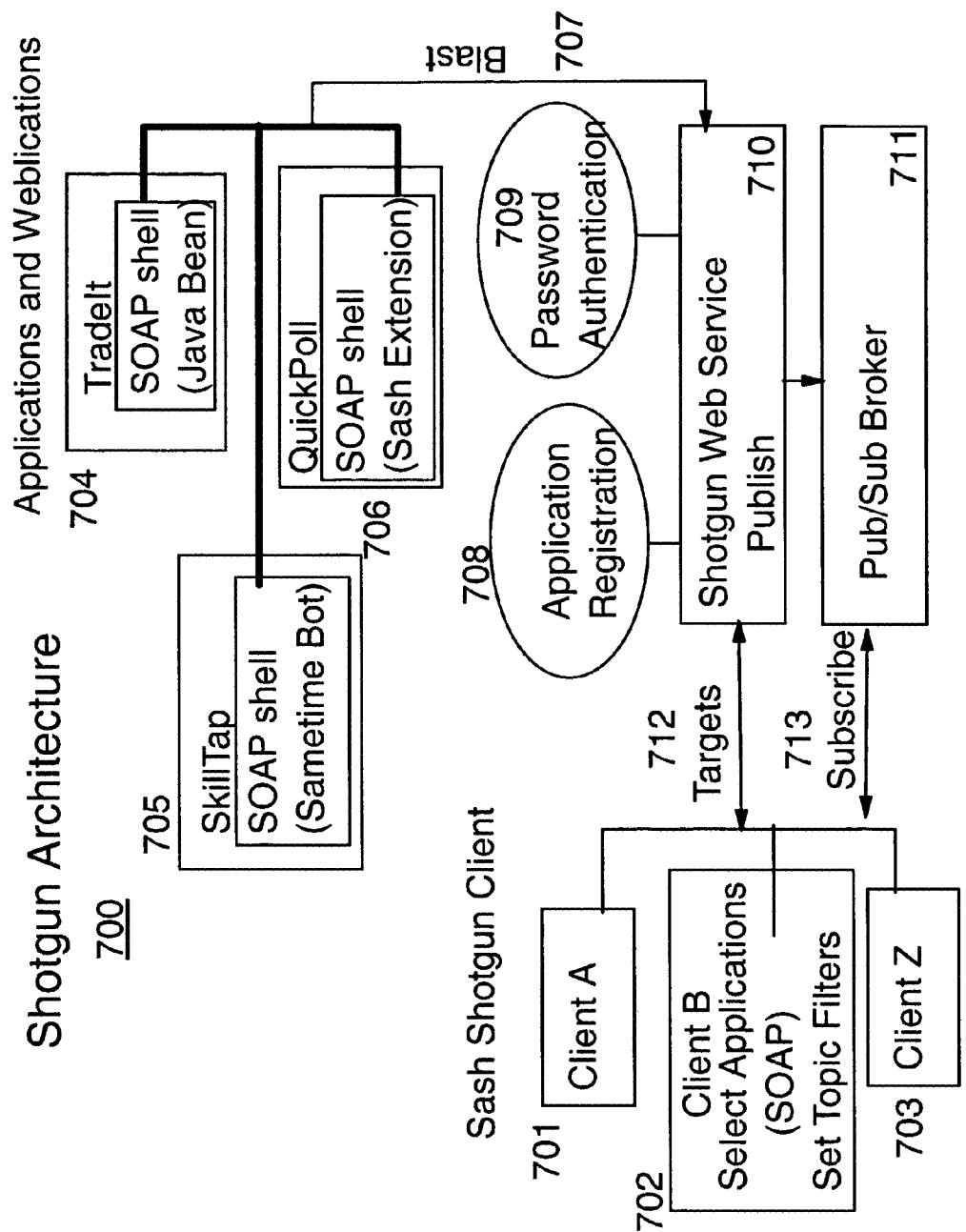
FIG. 7 depicts a preferred embodiment of the present invention.
Figure 8:
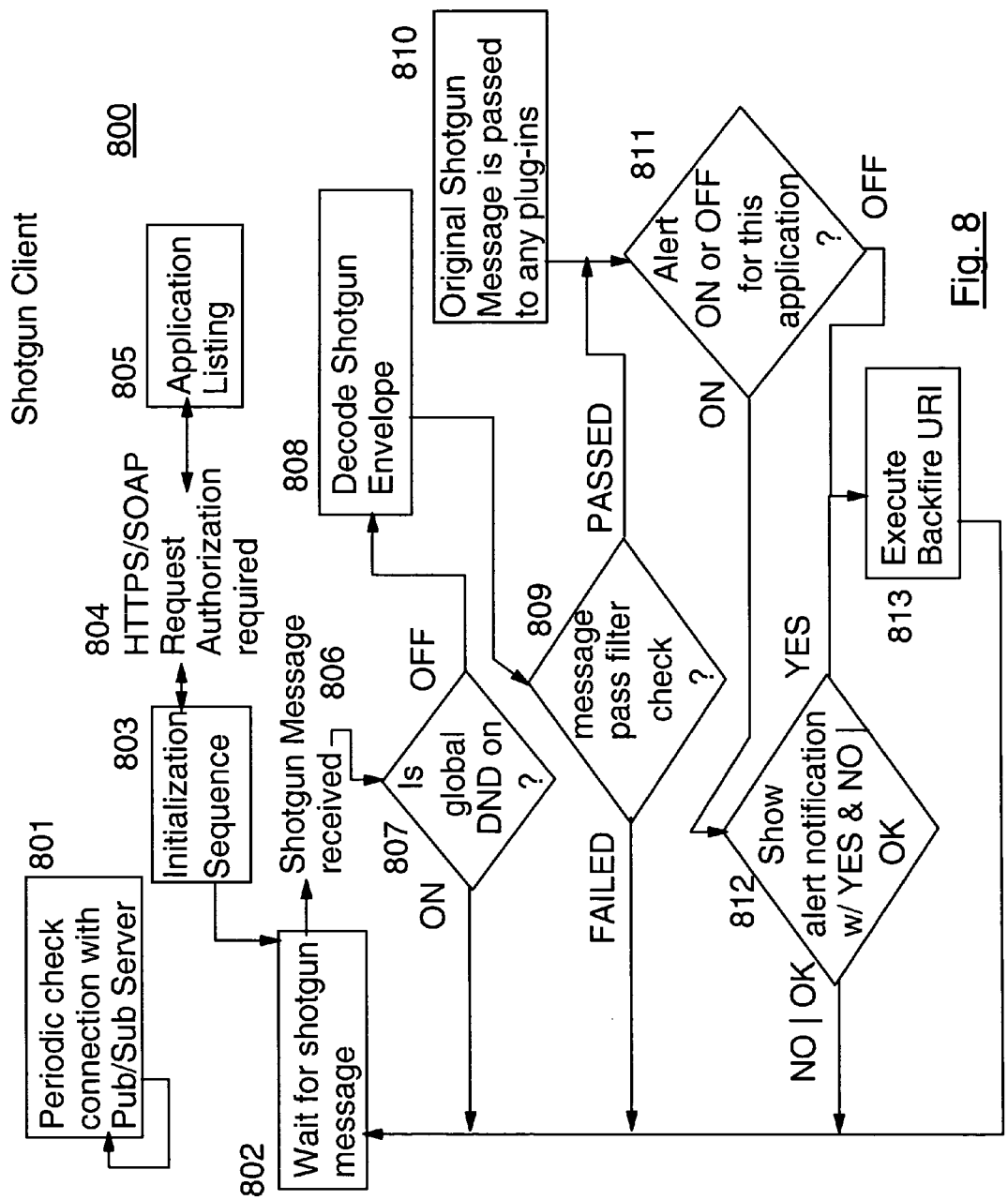
FIG. 8 is a flowchart function of a shotgun client of the present invention.
Figure 9:
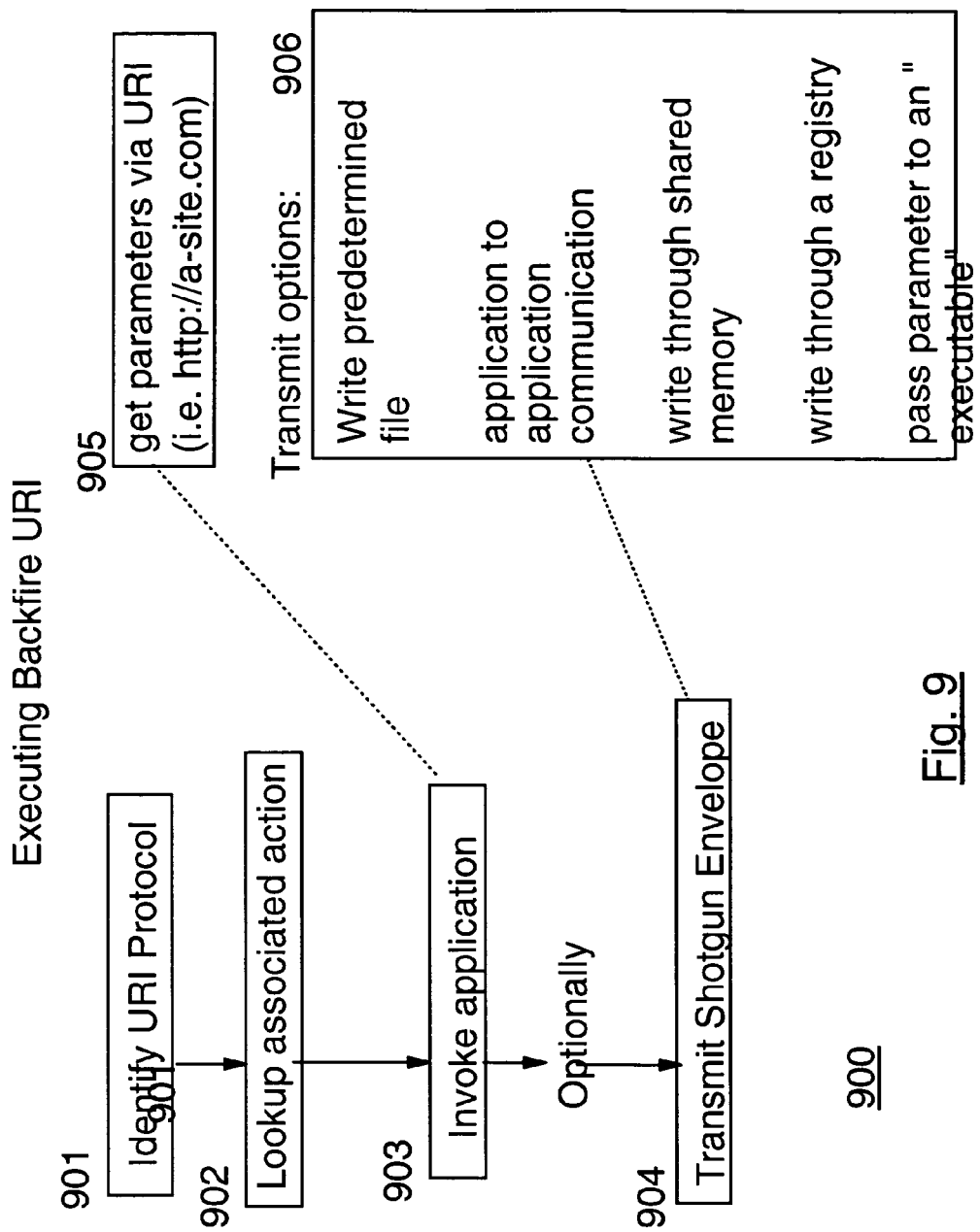
FIG. 9 is a flowchart of a shotgun client application of the present invention.

Referring now to FIG. 7, Shotgun 700 is an end-to-end Publish/Subscribe e-Utility. It includes three major components: the IBM GRYPHON "pub/sub" broker 711, a Web Service publisher 710, and a generic IBM SASH subscriber application (Shotgun client subscriber application). Working together, these services provide a complete, easy to use solution for applications requiring message broadcast capability.

The GRYPHON message brokering system merges Pub/Sub communications and database functionality using "information flow graph" concepts. The information flow graph specifies the selective delivery of events, the transformation of events and the generation of new events from providers to information consumers. In the prior art pub/sub paradigm, events in a distributed environment are classified through a set of subjects (also known as topics, channels or groups). GRYPHON extends this paradigm to allow the selection of events by content (and/or subject) rather than simply subject and to allow event transformations. GRYPHON provides a general structure for message transformation. Events may change format, drop fields or gain new fields.

The SASH application, also available from International Business Machines, is a dynamically configurable programming environment for rapidly building and deploying platform-integrated desktop applications using JavaScript and DHTML. This programming environment enables Web programming beyond the browser, and the resulting applications are integrated seamlessly into the common desktop environment and take advantage of the latest standards in Web services.

The pub/sub model allows applications to publish data on "channels", similar to television or radio broadcasting, and clients can "tune in" to listen for data—even listen on many channels at one time.

Shotgun supports multiple applications 704-706, all publishing using the same infrastructure, with each application broadcasting data on one or more channels. For example Application A might be analogous to a TV cable company broadcasting to your home several channels of programs, and you might even be watching a ball game and keeping an eye on the weather channel at the same time (e.g. using PIP). Application B might be similar to a radio station broadcasting on both AM and FM channels to your home. And Application C might be analogous to an emergency support vehicle driving through your neighborhood, announcing evacuation procedures using a load speaker—in this case, a "single-channel" broadcast of information, which you may choose to "subscribe" to by opening your window.

The Shotgun GRYPHON Web Service 710 provides two major advantages to application developers. First, it provides a convenient SOAP interface to publish messages via the GRYPHON pub/sub server 711, without the need for incorporating its lower-level API, while supporting the most common broadcast requirements. Secondly, it automates the security mechanism for controlling who can publish data on channels. This is accomplished by integrating Password authorization.

Shotgun maintains a DB2 database directory of applications, accessed through an administrative SOAP service (which can be used for controlled self-registration of user-written applications). The directory contains channel access controls, owner identification, help text, and other application parameters used by the Shotgun client.

The Shotgun client 701-703 is a Sash web application (weblication), that is downloaded from the Web. The Shotgun client serves as a common interface to the GRYPHON server 711 for all pub/sub-enabled weblications running on the client machine. A user can download his choice of shotgun-enabled weblications from the Web, and, using a settings control option from the Shotgun client GUI, can easily select applications and channels, define message filters, and control new message alerts.

Figure 10:
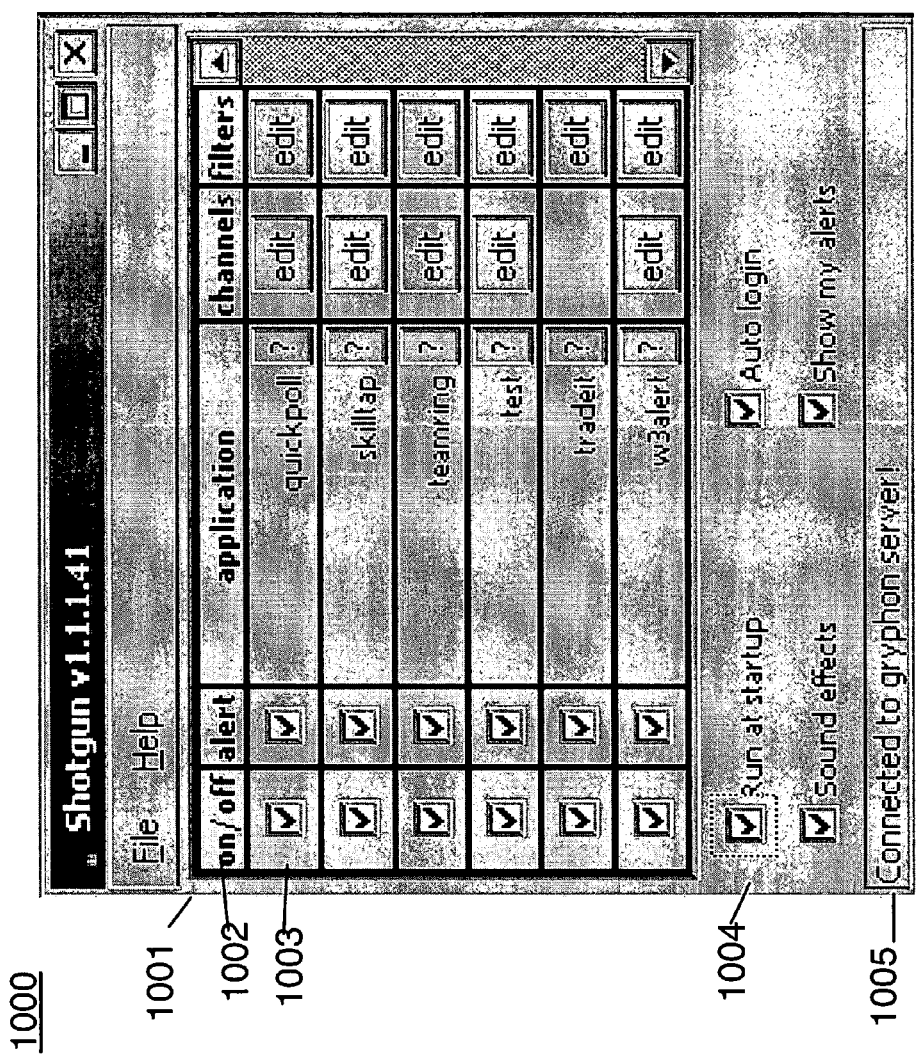
FIG. 10 is an example display of a service selection GUI of the present invention.
Figure 11:
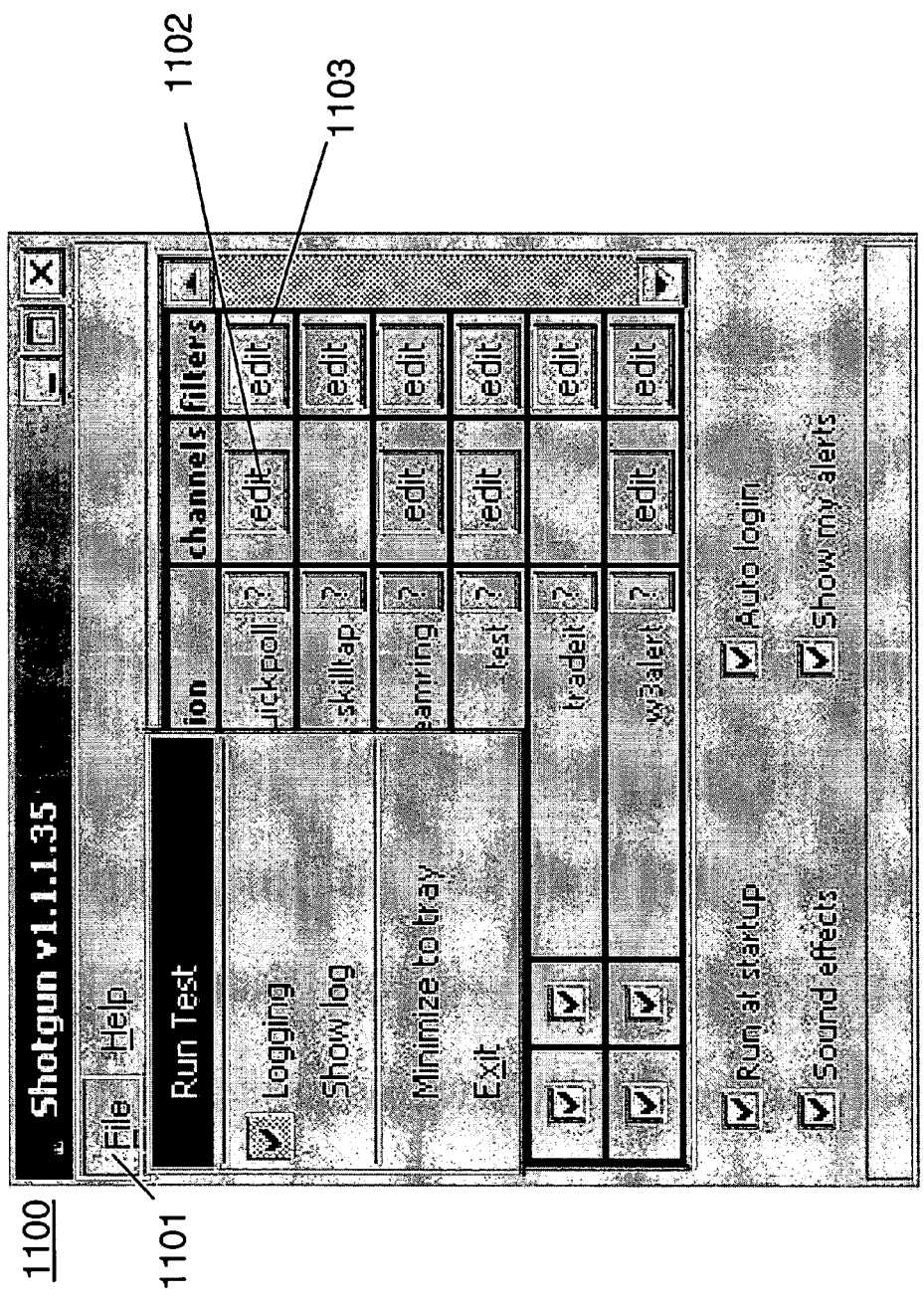
FIG. 11 depicts a second example display of a service selection GUI of the present invention.

FIG. 10 depicts a preferred embodiment of the Shotgun client GUI menu display. The display includes a list 1001 of all of the applications 1003 (Java web applications and Sash weblications) that are currently enabled for Shotgun message delivery (i.e., registered in the application directory). The column titles 1002 indicate the function below for each column of the table 1001. "On/off" indicates whether or not the user is subscribed to the application, "alert" indicates whether the user wants to receive alert messages from the application, "application" is a name of an application, "?" is a user interface (UI) button for requesting information about the application such as a brief description of its function, "Channels" is a UI button for selecting channels within the application and "filters" is a UI button for selecting filtering criteria for the application. As can be seen in the example 1003, the application "quickpoll" is subscribed to (on/off is checked) and alerts are requested (alert is checked). Other functionality 1004 is common to all selected applications. In the example 1004, the applications selected start to run at startup time, sound effects are enabled for the selected applications, login automatically is enabled allowing the shotgun system to login to the applications automatically and alert messages are allowed to automatically display. An indication of the network status 1005 shows that the shotgun client is connected to the GRYPHON server.

"QuickPoll" and "SkillTap" are implemented as Sash weblications and must be downloaded separately from the Web (Sash Weblication Factory). "TradIt" is a Java Websphere application, which requires no shotgun client download. "Test" is available for users to send test messages to simulate application publishing, and to test alert handling for channel and text filters. As mentioned earlier, some applications support multiple channels and others require no channel selection. In the example 1100, QuickPoll allows user selection of listening channels.

Figure 12:
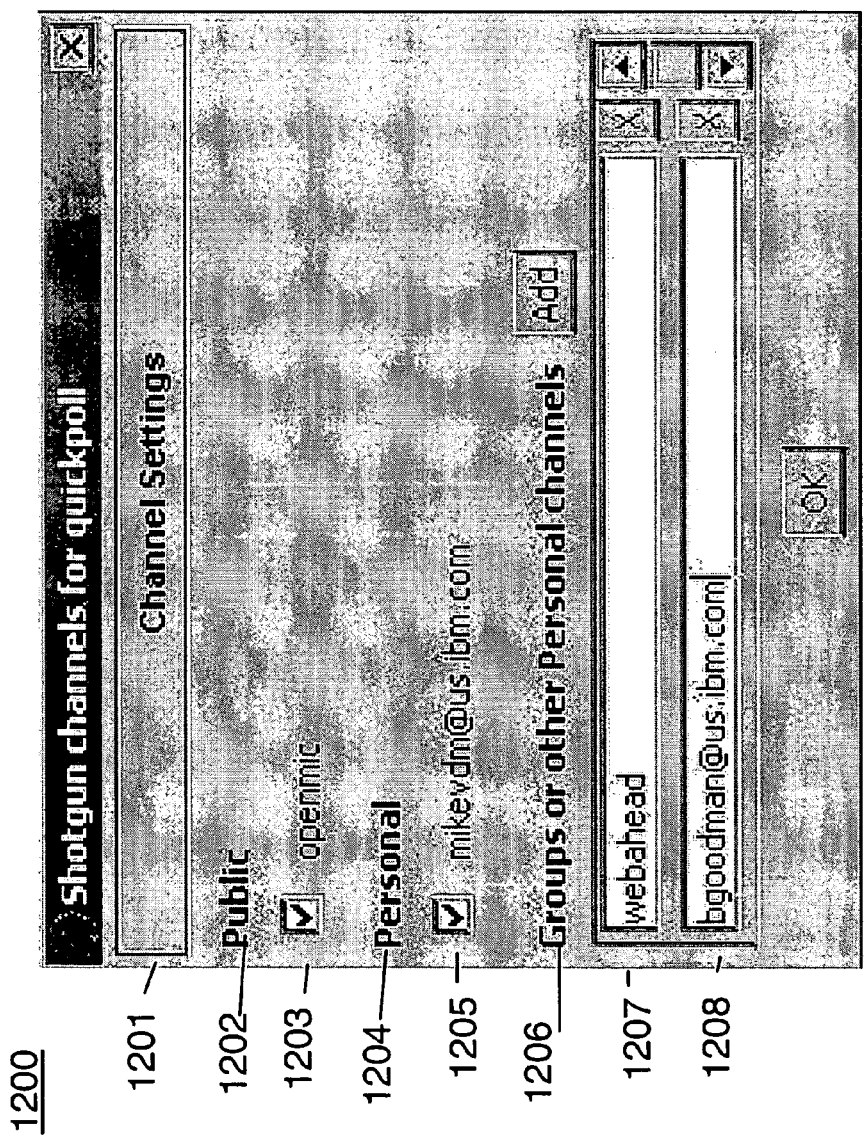
FIG. 12 is an example display of a channel selection menu.

In FIG. 12, pressing the "edit" button 1102 for the "quickpoll" application in the "Channels" column brings up a window 1200 at the shotgun client terminal. If the application provides a public broadcast channel (meaning anyone can subscribe), its name is displayed first ("openmic" 1203 in this case). Anyone with a valid ID is allowed to publish on this channel. To listen for messages on the public channel 1203, the user selects the check box 1203. Next, if enabled by the application, is the personal channel 1205, which matches the user's personal network ID. Only the user can publish on this channel, but others can elect to listen. A check in the Personal box 1205 enables the user to receive any data he publishes.

In the preferred embodiment, a user has the option to add as many other personal channels 1208 (i.e., your manager's Intranet ID) or "group" channels 1207. Groups 1207 are defined using a program called BlueGroups. The Shotgun GRYPHON Web Service will authenticate the publisher's network ID to ensure that it is a member of the group and that the channel name on which the data is published matches the group name. In the example 1200, only members of group "webahead" (defined as a set of department numbers via an LDAP search filter) are allowed to publish on the webahead channel 1207.

Figure 13:
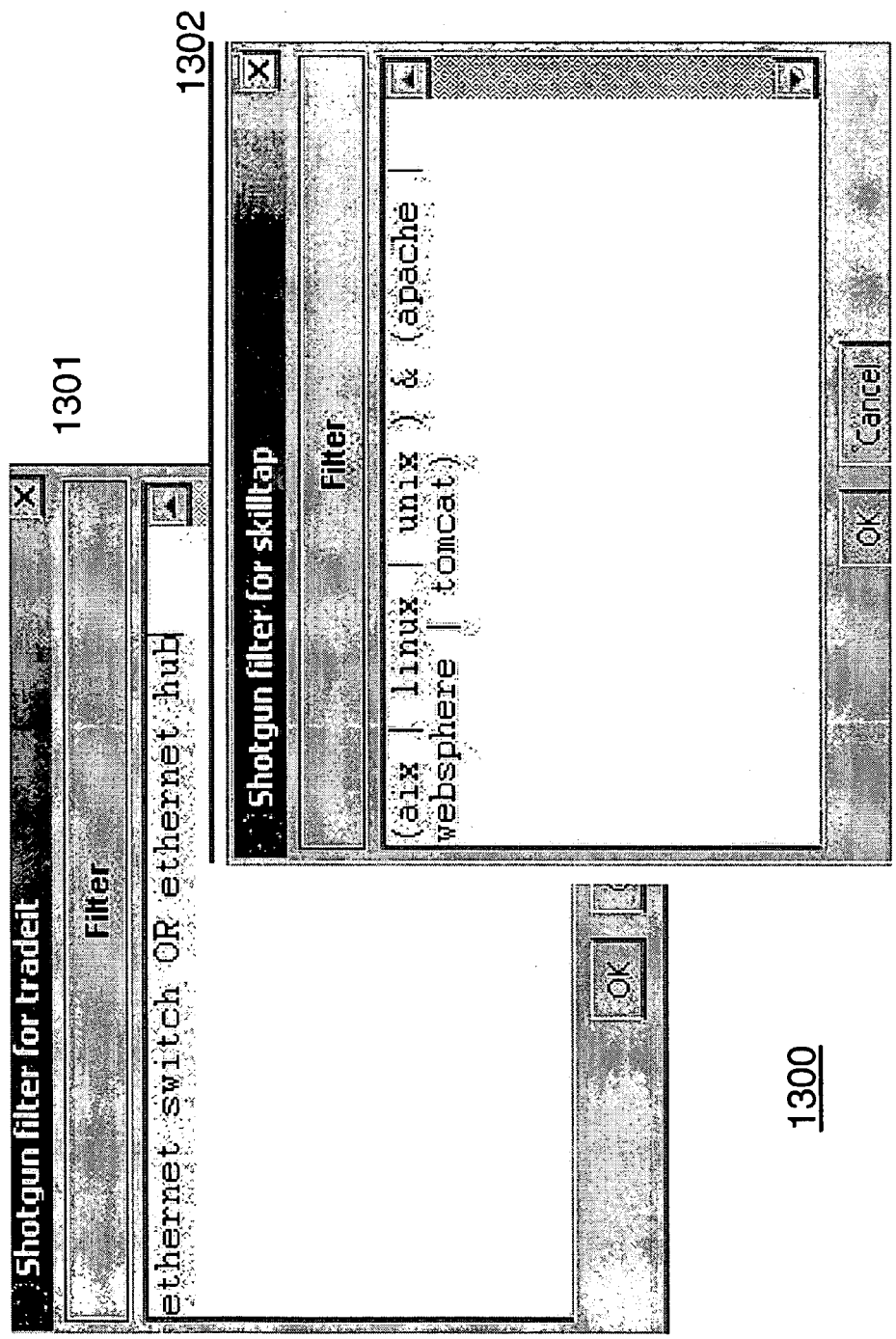
FIG. 13 is an example display of creating filters for selected applications.

Referring now to FIG. 13, in addition to channel selection, a user may set message "filters" for any application using the "edit" button 1103 on the settings menu 1001. The message filter allows the user to test for certain words, phrases, or combinations using simple "AND" and "OR" expressions or even complex programming-style expressions that evaluate to true or false, to determine whether he will be presented with an alert box displaying the incoming message. This allows the user to filter out unwanted messages.

Figure 14:
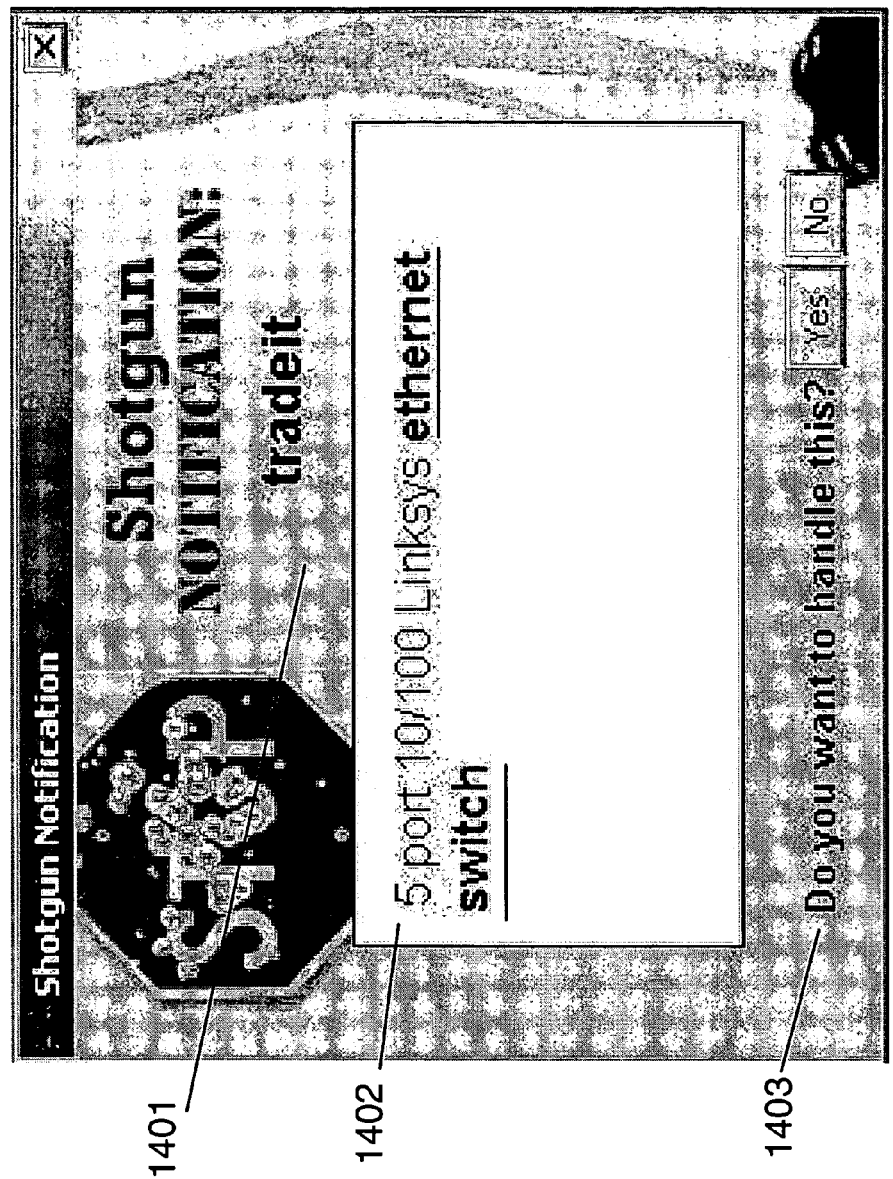
FIG. 14 is an example of an alert message of the present invention.
Figure 15:
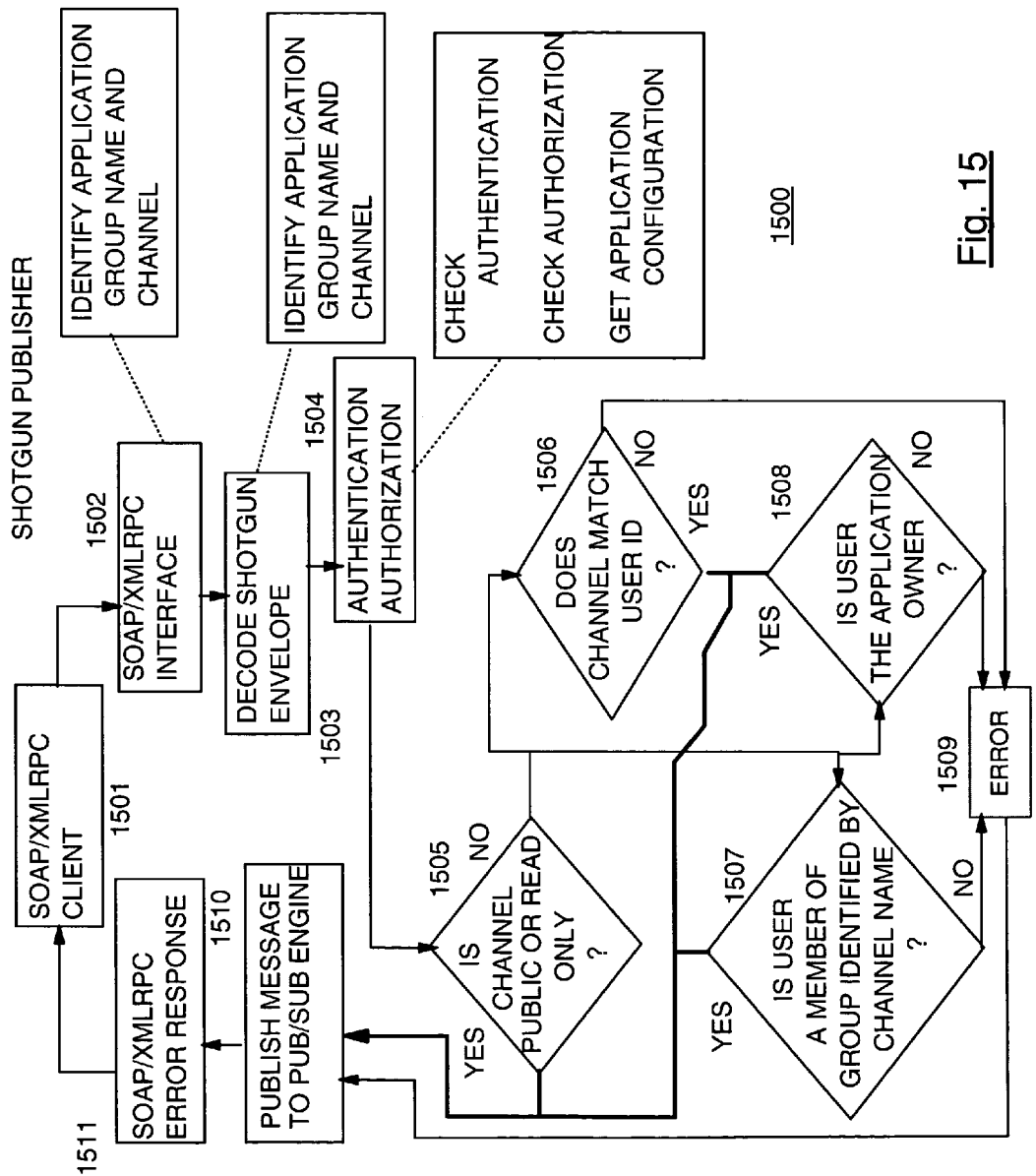
FIG. 15 is a flowchart example of the publisher function of the present invention.
Figure 16:
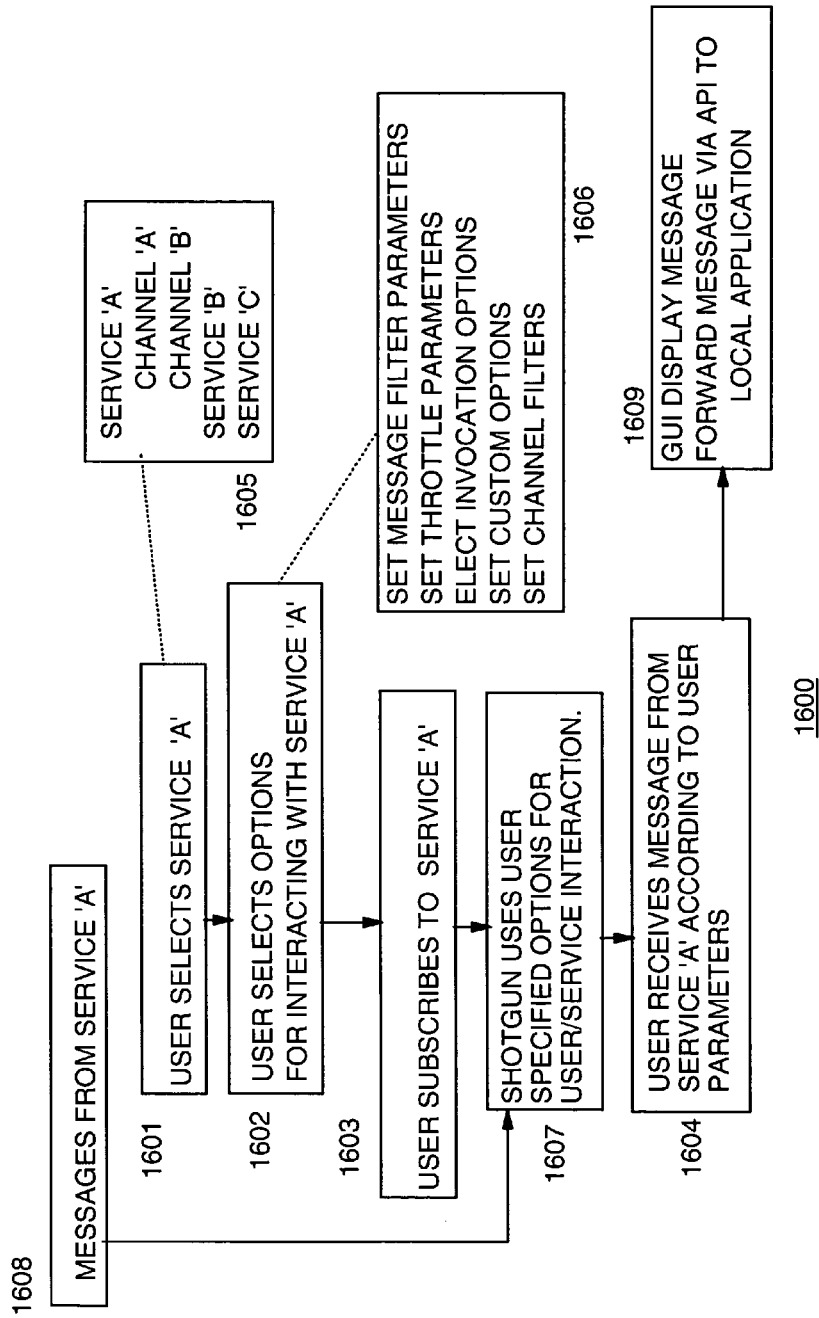
FIG. 16 is a flowchart example of coded messages.
Figure 17:
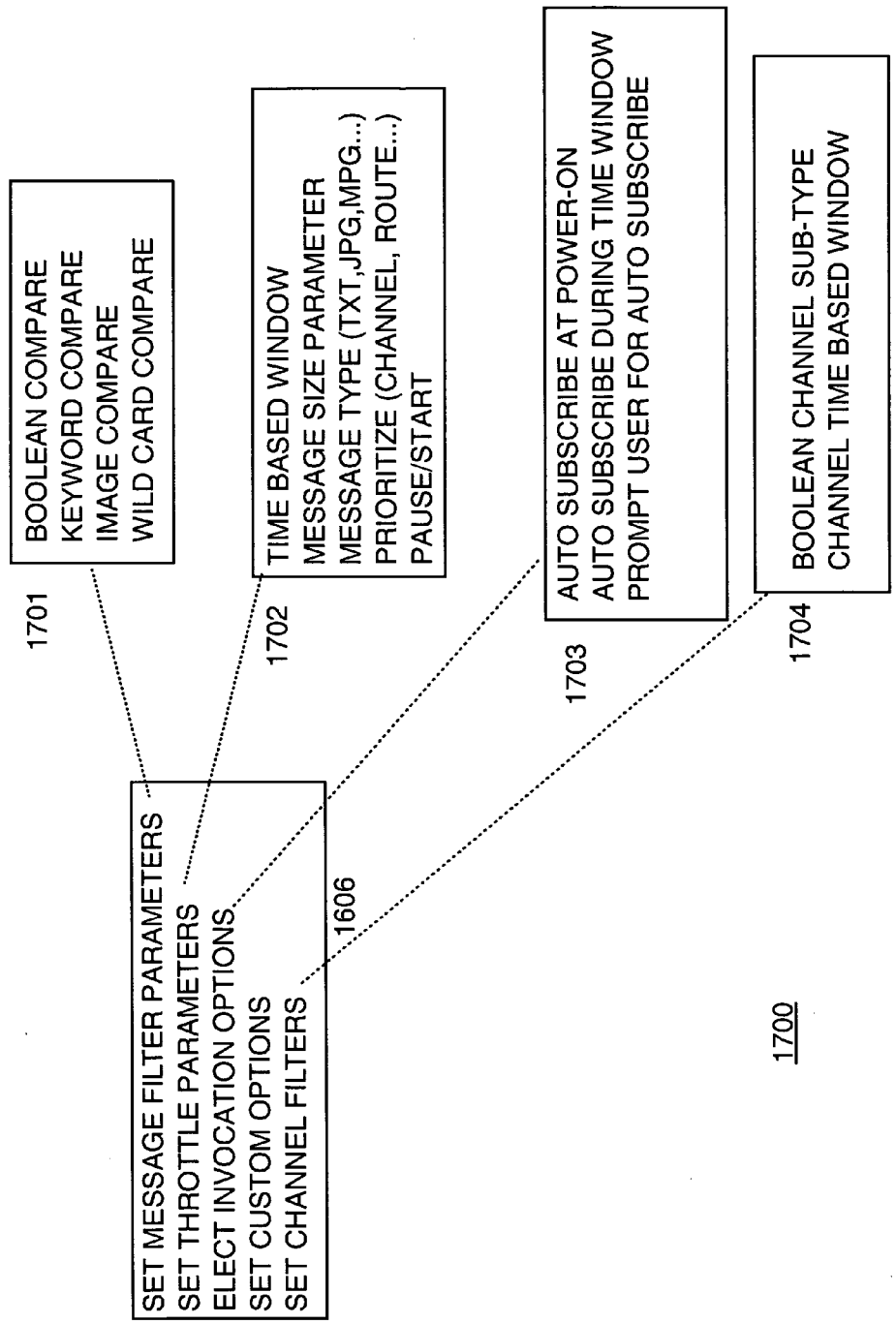
FIG. 17 is a flowchart example of setup options.
Figure 18:
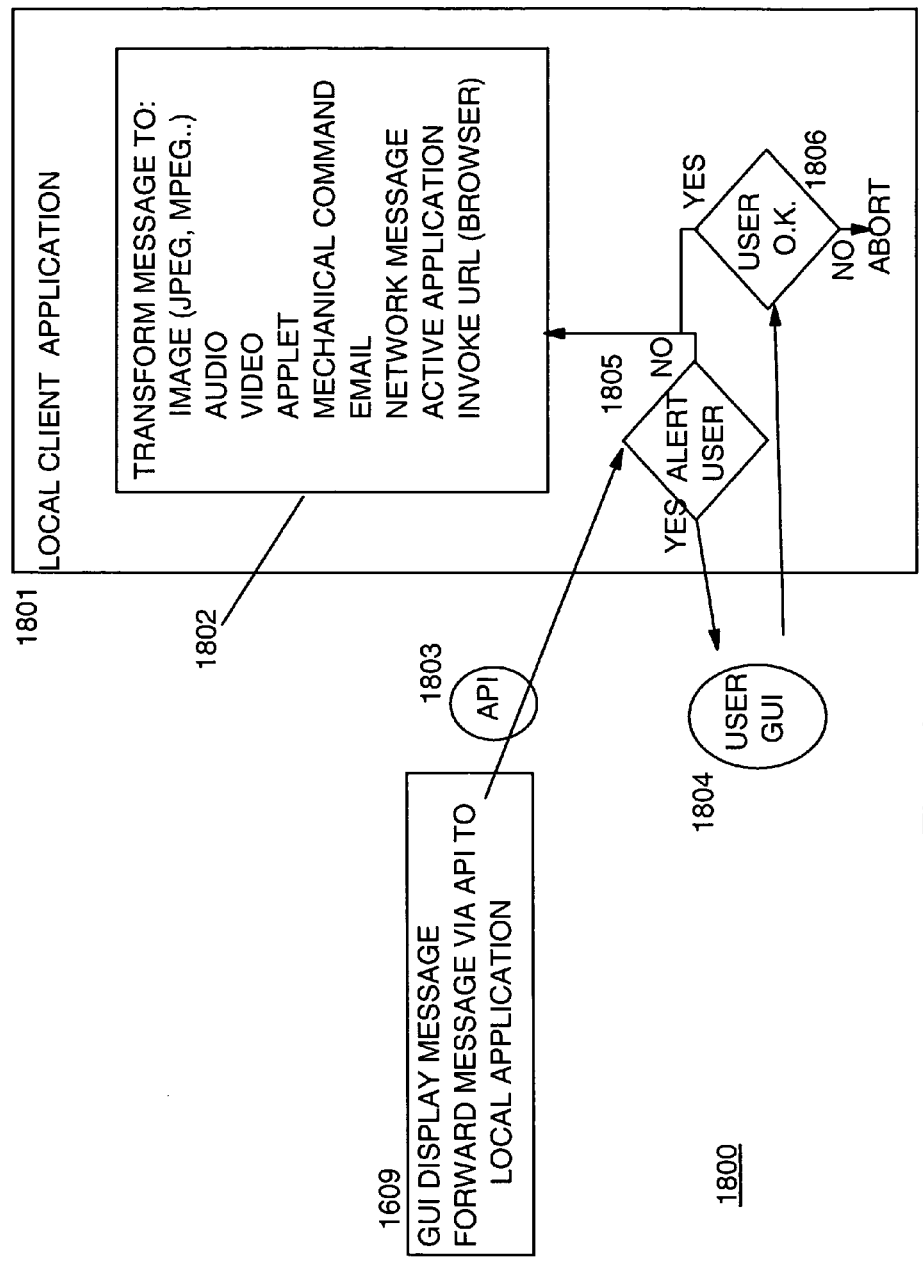
FIG. 18 is a flowchart example of message usage.
Figure 19:
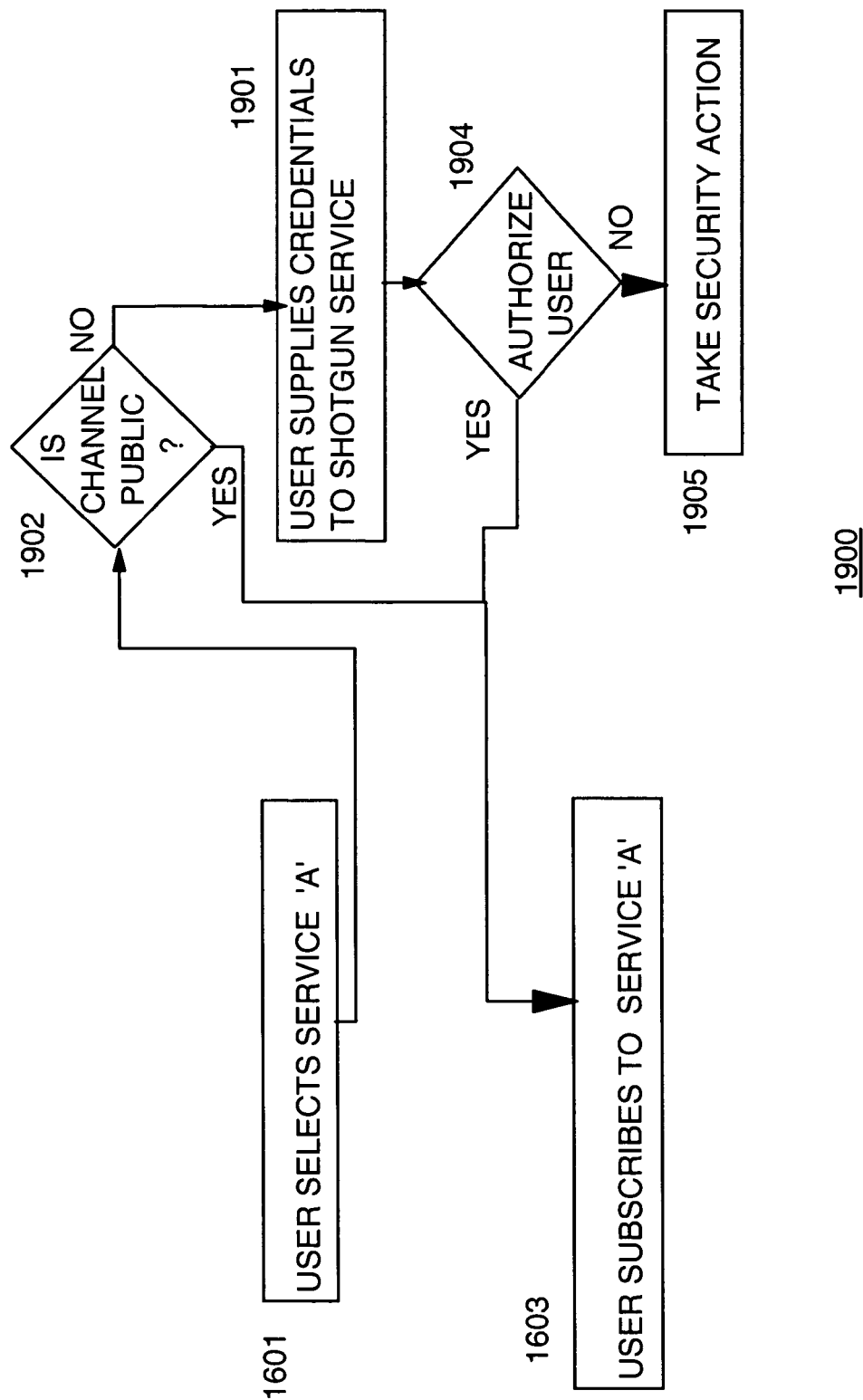
FIG. 19 is a flowchart example of subscribing to a service.
Figure 20:
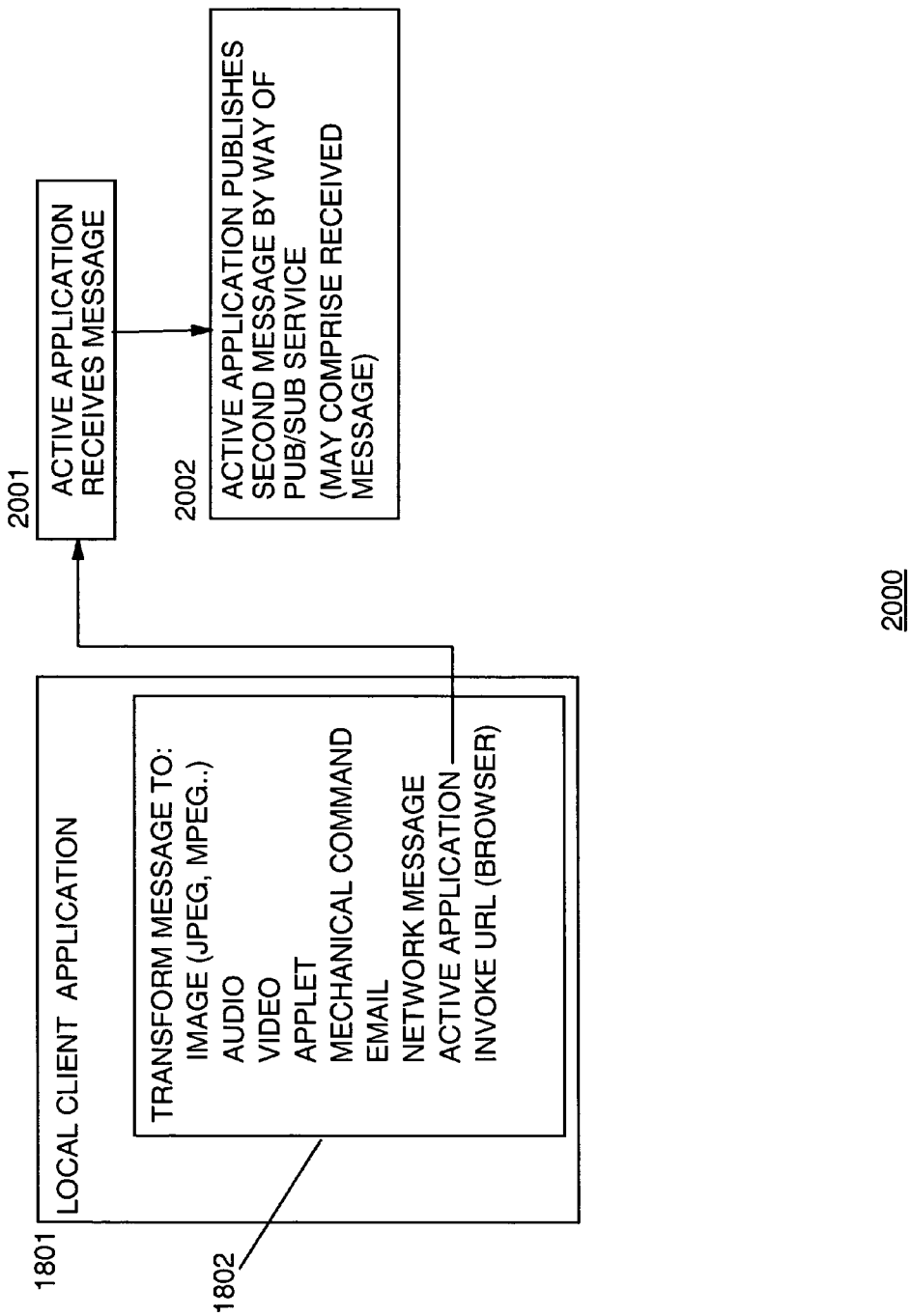
FIG. 20 is a flowchart example of client message processing.
Figure 21:
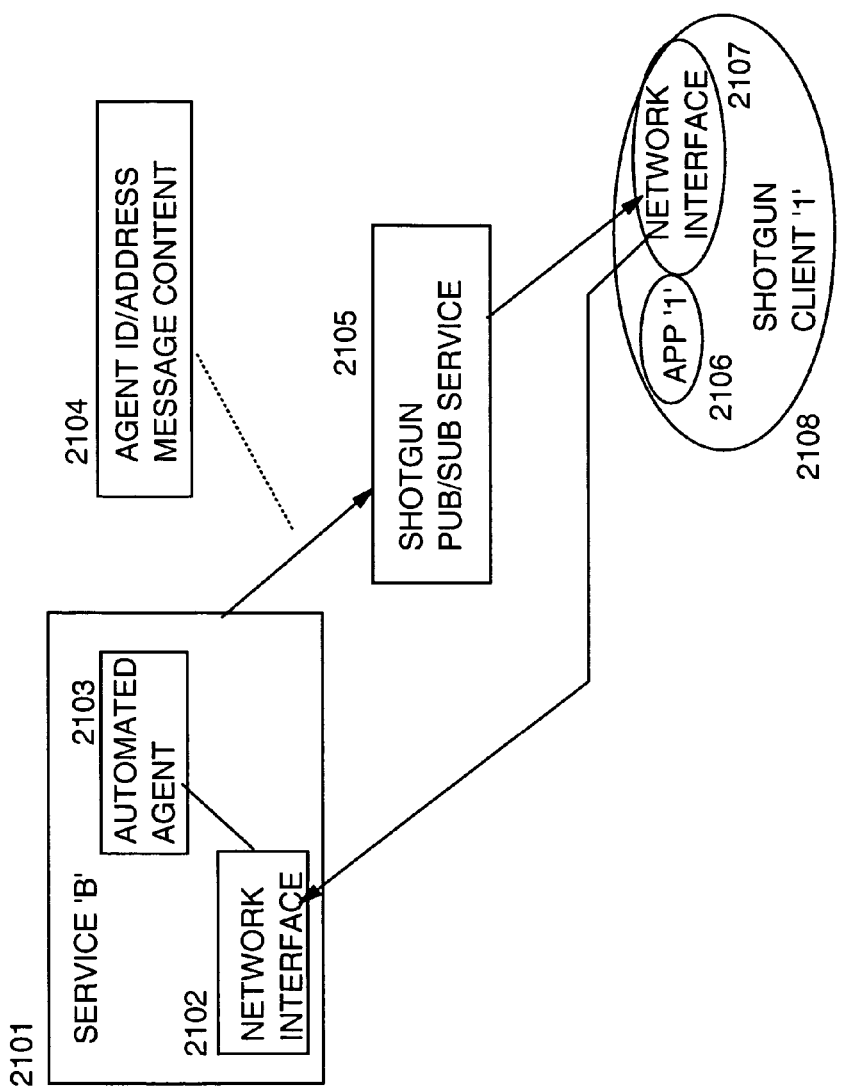
FIG. 21 is a logical depiction of interaction between a client and a service according to the invention.
Figure 22:
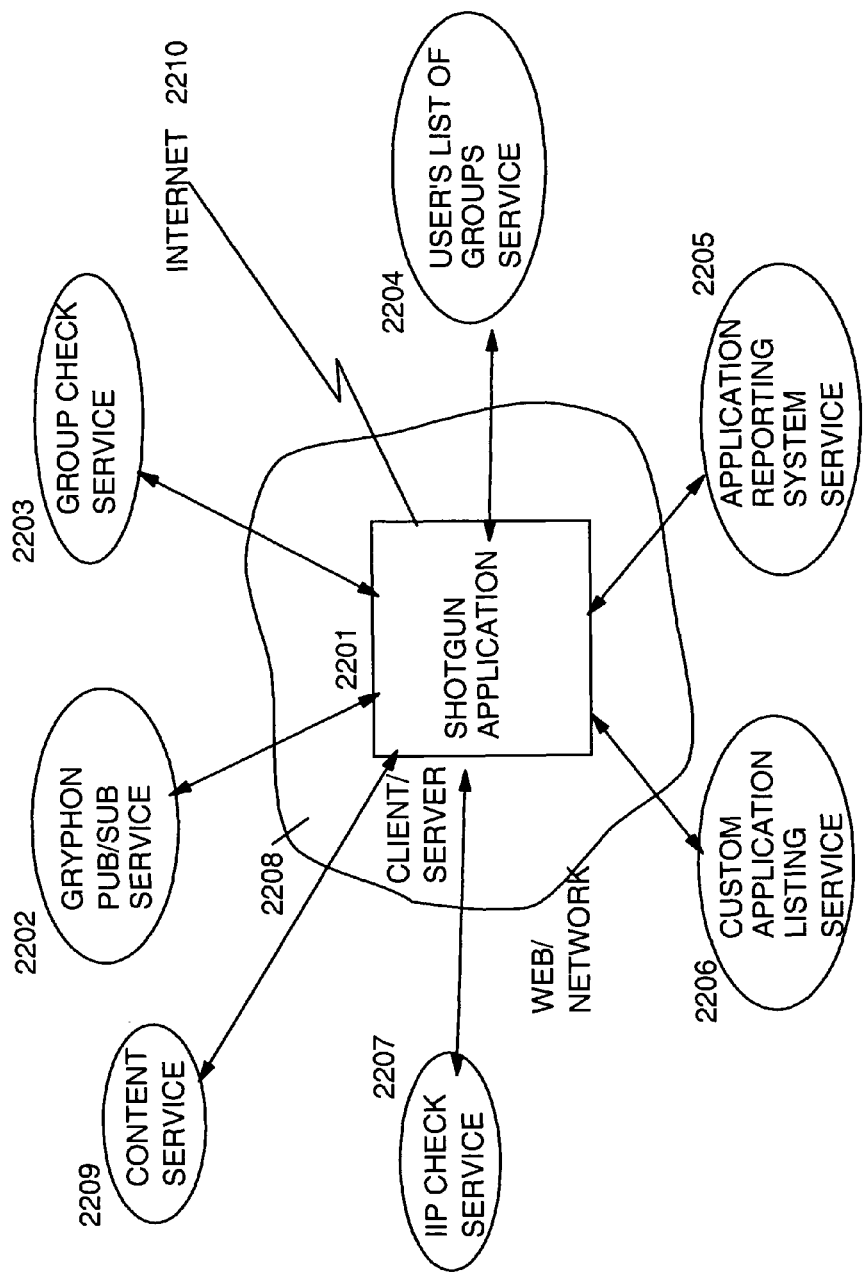
FIG. 22 depicts a Web services implementation of Shotgun.
Figure 23:
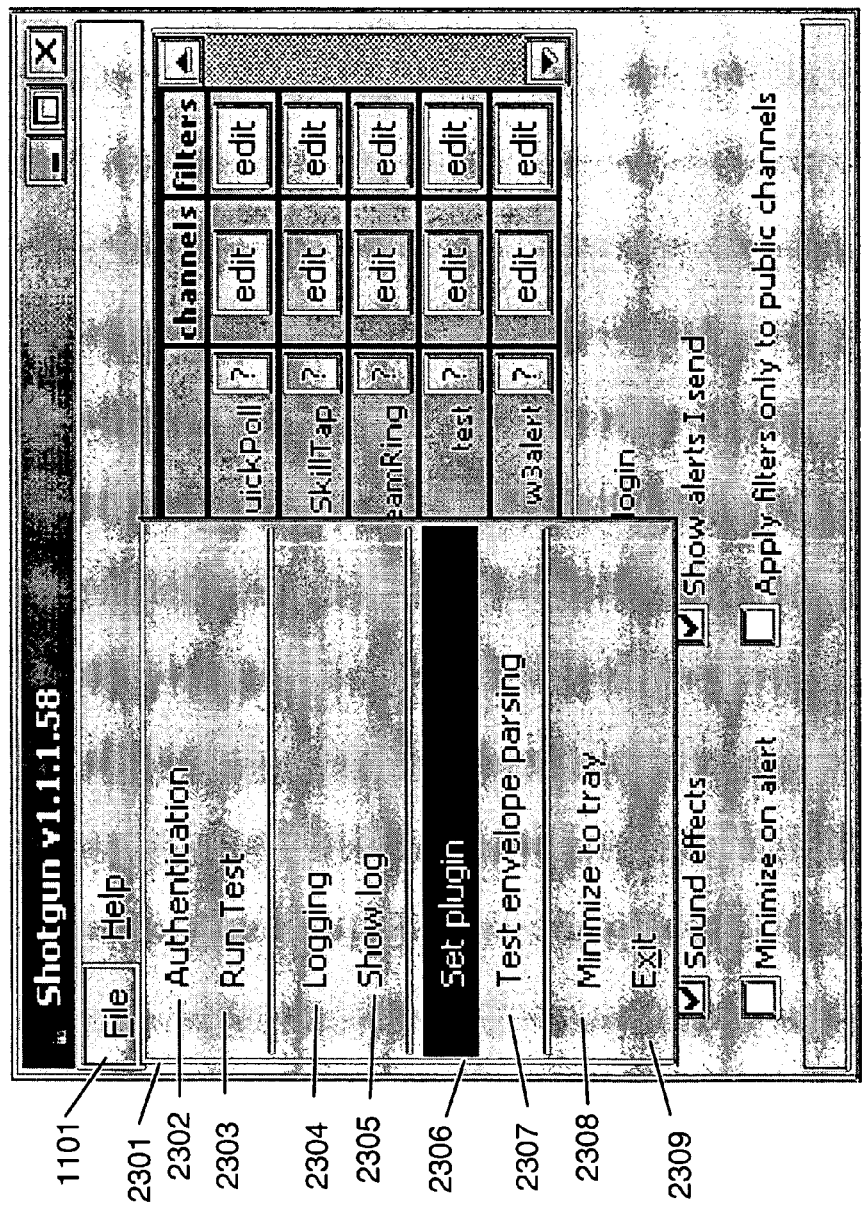
FIG. 23 is an example GUI used to elect options.
Figure 24:
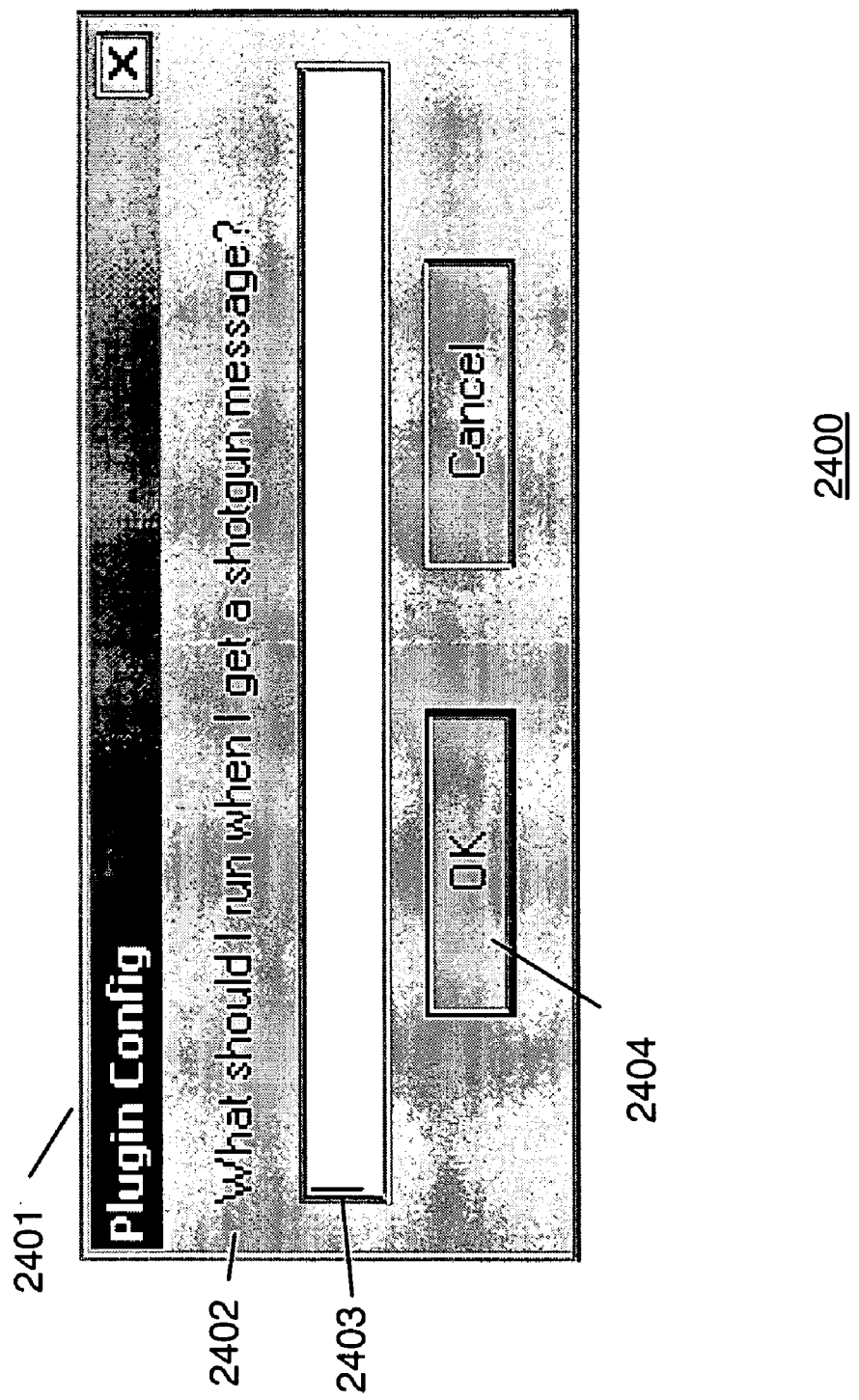
FIG. 24 is an example GUI used to set a "Plugin".

FIG. 14 shows two sample filters. The tradeIt application filter 1301 alerts the user when a coworker posts an item for trade that the user needs. Here the user has elected to receive messages that contain the key phrases "ethernet switch" or "ethernet hub". The second example is the SkillTap application filter 1302, which allows the user to immediately see requests for assistance as posted by fellow employees. Here, only messages that contain any of ("AIX" or "LINUX" or "UNIX") and also contain any of ("APACHE" or "WEBSPHERE" or "TOMCAT") will display an "alert" message on the user screen indicating an incoming message.

When an "alert" option in the settings menu is checked for an application, messages that contain the information defined by the channel and filter settings will cause a notification window to display rather than displaying the filtered message immediately. FIG. 14 shows an example alert message 1400 for the "tradeit" application (identified in the alert window 1401) that includes the filter criteria "ethernet switch" in the alert message 1402. The alert display includes an action UI button function 1403 that allows the user to decide whether or not he wants to continue in the application, in which case he hits the "yes" button.

The application ("Tradeit" in this case) is shown in the alert window 1400 of FIG. 14, along with a "blast" message 1402, with words highlighted in red that match the filter rule that was fired. The user then has the option 1402 to ignore the event, or select "yes" to trigger a "backfire URL" that was set by the application. In this example, Selecting "yes" will cause an Internet browser window to launch for an HTTP URL (in the case of a web application, such as Tradeit). In another embodiment, another Sash weblication may be launched by the backfire URL (such as QuickPoll or SkillTap). In this case, the Tradeit backfire URL calls a servlet that displays details about the item posted for trade by the responder. Note 1000 that if the "alert" option is unchecked in the selection table, but the application is enabled (via "on/off"), and an incoming message passes the channel and filter rules, the backfire URL will be launched immediately.

Table 1 shows example message fields for a preferred embodiment. Table 2 shows an example "request for publish" message and a corresponding "publish" message.

TABLE 1

| Message Fields: |
|---|
| Blast |
|     Possible values: string |
|     Used as the message present to a user if alert mechanism is active |
| Payload |
|     Possible values: string |
|     Non-Shotgun application specific information |
| Backfire |
|     Possible values: null, string in the format of proto://params and args |

TABLE 1-continued

Message Fields:

URI defining action needed to be taken to fulfill
Channel (Added by publish mechanism)
  Possible values: null, string
  Channel the message is intended for
Publisher (Added by publish mechanism)
  Possible values: string
ID of the publisher
Proxy (Added by publish mechanism)
  Possible values: string
  ID of the user the publisher is publishing on behalf of

TABLE 2

```
            )LOAD MOBALERT
       SAVED 2002-07-16 13.26.26 (GMT-4)
            ∇To [□]∇
[0]         To;CH;F;FROM;L;LF;MSG;P;SUBJ;SV1;TF;TO;TOP;XML
[1]         A FORWARD A SHOTGUN ALERT TO A MOBILE DEVICE
[2]           TO←6↓⊟
[3]           TOP←UPC 6↓⊟
[4]           LF←'ON,'=UPC 3↑F←4↓L←⊟
[5]           F←3↓F
[6]           LAST_XML←XML←ε∆∇ TF←⊟
[7]           DELETE TF
[8]           →(0=ρCH←'topic' XGET XML)/END
[9]         A IS THIS A CHANNEL WE ARE INTERESTED IN?
[10]          →(~(UPC CH)MATCH TOP)/END
[11]        A WHO IS THE SENDER?
[12]          FROM←'publisher' XGET XML
[13]          ↓(0≠ρP←'proxy' XGET XML)/'FROM←P'
[14]          ↓('<![CDATA['≡9↑MSG←'blast' XGET XML)/'MSG←9↓⁻3↓MSG'
[15]          SUBJ←'Shotgun',8↓CH
[16]        A SEND THE ALERT VIA THE SMTP SERVICE
[17]          P←MAIL FROM TO SUBJ MSG
[18]        A LOG THE EVENT IF REQUESTED BY THE USER
[19]          P←P,' (From: ',FROM,', To: 'TO,', Subject: ',SUBJ
[20]          ↓LF/'F LOG P,'', Message: '',MSG,'')'''
[21]        END:
            ∇2002-07-15 14.01.14 (GMT-4)
            ∇XGET[□]∇
[0]         Z←TAG XGET STRING
[1]           Z←2⊃('<',TAG,'>')('</',TAG,'>')EXTRACT STRING
            ∇2002-02-09 23.30.09 (GMT-4)
            ∇LOG [□]∇
[0]         F LOG D;RC
[1]         A SV100←((-(φF)L'\')↓F,'\NOW ',(DBLQUOTEεD),'>>',F
[2]         A RC←SV100
[3]           F APPENDFILE∇⊂('[',(NICE_DATETIME □TS),'] '),εD
            ∇|2002-02-25 22.27.52 (GMT-4)
            ∇MATCH[□]∇
[0]         Z←STR MATCH PAT;I;□IO
[1]         A DOES STRING MATCH PATTERN (WITH ^ AS WILDCARDS)?
[2]           □IO←0
[3]           LP:
[4]         A EXIT IF FIRST PART OF STRING DOES NOT MATCH
[5]           →(~Z←(I↑STR)≡(I←PAT⌊'^')↑PAT)/END
[6]         A PATTERN ENDS WITH WILDCARD AFTER MATCH SO FAR - OK
[7]           →(Z←(0=ρPAT←(I+1)↓PAT)∧'^'=⁻1↑PAT)/END
[8]         A DONE IF EXACT MATCH OF REMAINING TEXT (NO OTHER ^)
[9]           →(Z←(0=ρSTR←I↓STR)∧0=ρPAT)/END
[10]        A NO MATCH IF END OF STRING, BUT NOT END OF PATTERN
[11]          →(~Z←0≠ρSTR)/END
[12]        A NO MATCH IF ≠ STRING END & PATTERN END & NO END ^
[13]          →(~Z←0≠ρPAT)/END
[14]        A DROP WILDCARD MATCHES, IF NOTHING LEFT, NO MATCH
[15]          →(~Z←0≠ρSTR←((((PAT⌊'^')↑PAT)⊆STR)⌊1)↓STR)/END
[16]          →LP
[17]        END:
            ∇ 2002-07-16 13.21.35 (GMT-4)
            ∇MAIL[□]∇
[0]         Z←MAIL ARGS;FROM;MSG;SUBJ;T;TO
[1]         A SEND MAIL VIA SMTP SERVER, ARGS: FROM TO SUBJ TEXT
[2]         A MAIL 'me@foo.com' 'ed@bar.com' 'Shotgun alert' 'Hi!'
[3]           (FROM TO SUBJ MSG)←ARGS
[4]           Z←'webservices.ibm.com/soap/servlet/rpcrouter'''
[5]           Z←Z, 'urn:BlueMail' 'simplesend' '' 10
[6]           T←'<myTo xsi:type="xsd:string">',TO,'</myTo>'
[7]           T←T, '<myFrom xsi:type="xsd:string">' ,FROM, '</myFrom>'
[8]           T←T, '<mySub xsi:type="xsd:string">' ,SUBJ, '</mySub>'
[9]           T←T, '<myMsg xsi:type="xsd:string">' ,MSG, '</myMsg>'
```

TABLE 2-continued

| | |
|---|---|
| [10] | Z←Z SOAPWS T |
| [11] | T←'<return' |
| [12] | Z←(¯1+(('</', 1↓T)∈Z)⌊1)↑Z←(Z⌊ '>")↓Z←((T⊆Z)⌊) ↓Z |
| | ∇ 2002-07-16 13.26.23 (GMT-4) |
| | ∇SOAPWS[□]∇ |
| [0] | XML_OUT←PARMS SOAPWS XML_IN;ENDPOINT;ACTION;NAMESPACE; METHOD;IDPW;TIMEOUT;PROXY;USEPROXY;PORT;HOST;INDX;LEN;REQ;RC; SOCK;VAR119; SOAP119 |
| [1] | ⍝ ISSUE A WEB SERVICE REQUEST VIA SOAP HTTP INTERFACE |
| [2] | ⍝ PARMS: SOAP ENDPOINT URL, SOAP ACTION, NAMESPACE URI, METHOD NAME, USERID:PW, TIMEOUT [,PROXY URL] |
| [3] | (ENDPOINT ACTION NAMESPACE METHOD IDPW TIMEOUT PROXY) ←7↑PARMS,c'' |
| [4] | ➔(2≠RC←119 SVOFFER VAR119←'SOAP119')/ER |
| [5] | USEPROXY←0≠ρPROXY                 ⍝ USING PROXY? |
| [6] | PORT←80                           ⍝ DEFAULT EP PORT NUMBER |
| [7] | ➔((ρHOST)<INDX←(HOST←(LEN←¯1+ENDPOINT⌊'/')↑ENDPOINT)⌊ ':')/NOPORT |
| [8] | PORT←'80' □EA INDX↓HOST            ⍝ EXTRACT EP PORT NUMBER |
| [9] | HOST←(INDX−1)↑HOST                 ⍝ AND EP HOST DOMAIN NAME |
| [10] | NOPORT: |
| [11] | REQ←(HOST ACTION NAMESPACE METHOD IDPW)SOAPENV XML_IN |
| [12] | REQ←'POST ',(USEPROXY/'http://'),((LENx-USEPROXY)↓END POINT),REQ |
| [13] | ➔(¯1=↑RC←SOCK←GETSOCK '')/ER        ⍝ GET A SOCKET |
| [14] | ➔(¯1=↑RC←BLOCKING SOCK 0)/ER        ⍝ NON-BLOCKING MODE |
| [15] | ➔(¯1=↑RC←CONNECT SOCK(↑USEPROXYφPORT,80) (↑USEPROXYφHOST PROXY))/ER |
| [16] | ➔((¯1=↑RC)v~(,SOCK)=2 ⊃ RC ←SELECT(,SOCK)'W' TIMEOUT)/ER |
| [17] | ➔(¯1=↑RC←SENDALL SOCK REQ)/ER       ⍝ HTTP POST |
| [18] | LEN←ρXML_OUT←''                     ⍝ INIT XML RESPONSE |
| [19] | RECVLOOP: |
| [20] | ➔((¯1=↑RC)v~(,SOCK)=1 ⊃ RC ←SELECT(,SOCK)'R' TIMEOUT)/ER |
| [21] | ➔(¯1=↑RC←RECV SOCK)/ER              ⍝ READ NEXT CHUCK |
| [22] | XML_OUT←XML_OUT,RC                  ⍝ ADD TO RESPONSE BUFF |
| [23] | ➔((LEN←ρXML_OUT)≠LEN)/RECVLOOP       ⍝ MORE TO RECEIVE? |
| [24] | ➔DISCON                             ⍝ COMPLETED, DISCONNECT |
| [25] | ER: |
| [26] | XML_OUT←RC                          ⍝ RETURN ERROR CODES |
| [27] | ➔EXIT |
| [28] | DISCON: |
| [29] | R  C←CLOSE SOCK                    ⍝ CLOSE SOCKET |
| [30] | EXIT: |
| | ∇|2002-07-16 13.50.03 (GMT-4) |
| | ∇SOAPENV[□]∇ |
| [0] | ENV←PARMS SOAPENV XML_IN;ACTION;HOST;IDPW;NAMESPACE;METHOD; NL;XML |
| [1] | ⍝ GENERATE SOAP ENVELOPE FOR HTTP TRANSPORT |
| [2] | ⍝ PARMS: HOST, SOAP ACTION, NAMESPACE URI, METHOD NAME, USERID:PW |
| [3] | (HOST ACTION NAMESPACE METHOD IDPW)←PARMS |
| [4] | NL←□TC[□IO+1 2] |
| [5] | XML←'<?xml version="1,0" encoding="UTF-8"?>' |
| [6] | XML←XML,'<SOAP-ENV:Envelope ' |
| [7] | XML←XML,'xmlns:SOAP-ENV="http://schemas.xmlsoap.org/ soap/envelope/" ' |
| [8] | XML←XML,'xmlns:xsi="http://www.w3.org/1999/XMLSchema-instance" ' |
| [9] | XML←XML,'xmlns:xsd="http://www.w3.org/1999/XMLSchema" >' |
| [10] | XML←XML,'<SOAP-ENV:Body>' |
| [11] | XML←XML,'<ns1:',METHOD,' xmlns:ns1="',NAMESPACE,'" ' |
| [12] | XML←XML,'SOAP-ENV:encodingStyle="http://schemas.xmlsoap.org/ soap/encoding/">' |
| [13] | XML←XML,XML_IN |
| [14] | XML←XML,'</ns1:',METHOD,'>' |
| [15] | XML←XML,'<SOAP-ENV:Body>' |
| [16] | XML←XML,'<SOAP-ENV:Envelope>' |
| [17] | ENV←' HTTP/1.0',NL |
| [18] | ↓(0≠ρIDPW)/'ENV←ENV,"Authorization: Basic ",(BASE64 _ENCODE IDPW),NL' |
| [19] | ENV←ENV,'Host: ',HOST,NL |
| [20] | ENV←ENV,'Content-Type: text/xml; charset=utf-8',NL |
| [21] | ENV←ENV,'Content-Length: ',(⍕ρXML),NL |
| [22] | ENV←ENV,'SOAPAction: "',ACTION,'" ',NL |
| [23] | ENV←ENV,NL,XML |
| | ∇ 2001-12-11 23.16.19 (GMT-4) |
| | ∇BASE64_ENCODE[□]∇ |
| [0] | BASE64←SPLIT BASE64_ENCODE DATA;□IO;AV64;BINARY |

TABLE 2-continued

| | |
|---|---|
| [1] | A Encode using MIME Content-Transfer-Encoding: Base64 as specified in RFC 2045. |
| [2] | A Arguments:　　　DATA - Network character data to be encoded |
| [3] | A 　　　　　　　　SPLIT - Whether result should be split in to 76 byte records |
| [4] | A Result: Encoded data in network character representation |
| [5] | 　□IO ←0 |
| [6] | A□ES(1<ρρDATA)/5 2　　　A Must be scalar or vector |
| [7] | A□ES(255v,<□AV[DATA]/5 4　　A Must be single-byte character |
| [8] | ➡(0=ρDATA)/0 BASE64 ←" |
| [9] | 　SPLIT ←'0" □EA 'SPLIT' |
| [10] | A Encoding alphabet |
| [11] | 　AV64 ←'ABCDEFGHIJKLMNOPQRSTUVWXYZabcdefghijklmnopqrstu vwxyz0123456789+/' |
| [12] | A Convert alphabet to network character representation |
| [13] | 　AV64 ←HTONC AV64 |
| [14] | A Ensure data is a vector |
| [15] | 　DATA ←,DATA |
| [16] | A Convert to bits |
| [17] | 　BINARY ←'B1 1 ^ ' A RTA DATA |
| [18] | A Reshape to 6 column bit matrix |
| [19] | 　BINARY ←(([(ρBINARY)÷6),6)ρBINARY,6ρ0 |
| [20] | A Add two columns on the left |
| [21] | 　BINARY ←(−0 2+ρBINARY)↑BINARY |
| [22] | A Convert to alphabet selections |
| [23] | 　BASE64 ←AV64[□AF 'B1 1 ^ ' ATR,BINARY] |
| [24] | A Pad to multiple of 4 byte length |
| [25] | 　BASE64 ←(4×[(ρBASE64)÷4)↑BASE64,HTONC '===' |
| [26] | ➡(SPLIT=0)/0 |
| [27] | A Partition into 76 byte records |
| [28] | 　BASE64 ←((ρBASE64)ρ(76↑2,75ρ1)) ⊂ BASE64 |
| [29] | A Add carriage return line feeds |
| [30] | 　BASE64 ←∈BASE64, " ⊂ HTONC □TC[1 2] |
| | ∇ 2002-07-16 13.52.53 (GMT-4) |

The plugin capability of the present invention vastly extends the functionality of the present invention by permitting customized applications to perform function on incoming messages. It further allows the customized applications to interface with the shotgun application by way of a simple interface (API). In addition, the messages forwarded via the API to the customized application(s) use the powerful Channel and Filtering functions available to the Shotgun application.

While the preferred embodiment of the invention has been illustrated and described herein, it is to be understood that the invention is not limited to the precise construction herein disclosed, and the right is reserved to all changes and modifications coming within the scope of the invention as defined in the appended claims.

The invention claimed is:

1. A method for publishing electronic messages to a first group of clients within a group of clients in a publish/subscribe message publishing environment the first group of clients comprising:

authorized authorizing participating clients in network communication with a publish/subscribe service, the publish/subscription service publishing to the first group of clients over channels with each channel having a channel topic;

receiving subscriptions from the first group of clients by the publish/subscribe service for publishing over a channel having a channel topic according to the subscriber's selection, the subscriptions to persist during a specified criteria;

authenticating the identity of a first client as being in the first group of clients identified by the channel;

receiving a message from the authenticated first client, the message having the channel identification as a part thereof and destined for publication to a first group of clients;

verifying the first client is authorized for publishing messages to the first group of clients for the identified channel of the first group of clients;

publishing the message by way of the publish/subscribe service to clients of the first group of clients for the channel topic;

publishing with the publish/subscribe service, an application to be run on the clients of the first group of clients; and associating the first client identity with a client group by an authorization database, a data repository and a predefined attribute.

2. The method according to claim 1 wherein any one of the steps of authenticating, receiving, verifying or publishing is performed by a web service.

3. The method according to claim 1 wherein authenticating comprises any one of identifying the first client or authorizing the first client.

4. The method according to claim 1 wherein the message is structured using XML.

5. The method according to claim 1 wherein the message comprises a message envelope, wherein the message envelope comprises a message body and a message header.

6. The method according to claim 1 wherein the message is a SOAP message.

7. The method according to claim 1 wherein the first service publishes the message to any one of a first application, an automated instant message address (Bot), a servlet or a Mobile Device.

8. The method according to claim 1 wherein the authenticated first client comprises any one of a human user, a first application, an automated instant message address (Bot), a servlet/CGI application or a mobile device.

9. A computer program product for publishing electronic messages to a first group of clients within a group of clients in a publish/subscribe message publishing environment the first group of clients comprising;

authorizing participating clients in network communication with a publish/subscribe service, the publish/subscription service publishing to the first group of clients over channels with each channel having a channel topic;

a non-transitory storage medium readable by a processing circuit and storing instructions for execution by the processing circuit for performing:

receiving subscriptions from the first group of clients by the publish/subscribe service for publishing over a channel having a channel topic according to the subscriber's selection, the subscriptions to persist during a specified criteria;

authenticating the identity of a first client as being in the first group of clients identified by the channel;

receiving a message from the authenticated first client, the message having the channel identification as a part thereof and destined for publication to a first group of clients;

verifying the first client is authorized for publishing messages to the first group of clients for the identified channel of the first group of clients;

publishing the message by way of the publish/subscribe service to clients of the first group of clients for the channel topic;

publishing with the publish/subscribe service, an application to be run on the clients of the first group of clients; and associating the first client identity with a client group by an authorization database, a data repository and a pre-defined attribute.

10. The computer program product according to claim 9 wherein any one of the steps of authenticating, receiving, verifying or publishing is performed by a web service.

11. The computer program product according to claim 9 wherein authenticating comprises any one of identifying the first client or authorizing the first client.

12. The computer program product according to claim 9 wherein the message is structured using XML.

13. The computer program product according to claim 9 wherein the message comprises a message envelope, wherein the message envelope comprises a message body and a message header.

14. The computer program product according to claim 9 wherein the message is a SOAP message.

15. The computer program product according to claim 9 wherein the first service publishes the message to any one of a first application, an automated instant message address (BOO, a servlet or a Mobile Device.

16. The computer program product according to claim 9 wherein the authenticated first client comprises any one of a human user, a first application, an automated instant message address (BOO, a servlet/CGI application or a mobile device.

17. A system for publishing electronic messages to a first group of clients within a group of clients in a publish/subscribe message publishing environment the first group of clients comprising:

authorizing participating clients in network communication with a publish/subscribe service, the publish/subscription service publishing to the first group of clients over channels with each channel having a channel topic;

a network;

a client system in communication with the network;

a publish/subscribe service in communication with the network wherein he system inc. tides instructions to execute a method comprising;

receiving subscriptions from the first group of clients by the publish/subscribe service for publishing over a channel having a channel topic according to the subscriber's selection, the subscriptions to persist during a specified criteria;

authenticating the identity of a first client as being in the first group of clients identified by the channel;

receiving a message from the authenticated first client, the message having the channel identification as a part thereof and destined for publication to a first group of clients;

verifying the first client is authorized for publishing messages to the first group of clients for the identified channel of the first group of clients;

publishing the message by way of the publish/subscribe service to clients of the first group of clients for the channel topic;

publishing with the publish/subscribe service, an application to be run on the clients of the first group of clients; and associating the first client identity with a client group by an authorization database, a data repository and a pre-defined attribute.

18. The system according to claim 17 wherein any one of the steps of authenticating, receiving, verifying or publishing is performed by a web service.

19. The system according to claim 17 wherein authenticating comprises any one of identifying the first client or authorizing the first client.

20. The system according to claim 17 wherein the message is structured using XML.

21. The system according to claim 17 wherein the message comprises a message envelope, wherein the message envelope comprises a message body and a message header.

22. The system according to claim 17 wherein the message is a SOAP message.

23. The system according to claim 17 wherein the first service publishes the message to any one of a first application, an automated instant message address (Bot), a servlet or a Mobile Device.

24. The system according to claim 17 wherein the authenticated first client comprises any one of a human user, a first application, an automated instant message address (Bot), a servlet/CGI application or a mobile device.

\* \* \* \* \*